(12) United States Patent
Namiki et al.

(10) Patent No.: US 11,227,144 B2
(45) Date of Patent: Jan. 18, 2022

(54) IMAGE PROCESSING DEVICE AND METHOD FOR DETECTING IMAGE OF OBJECT TO BE DETECTED FROM INPUT DATA

(71) Applicant: FANUC CORPORATION, Yamanashi (JP)

(72) Inventors: Yuta Namiki, Yamanashi (JP); Fumikazu Warashina, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 194 days.

(21) Appl. No.: 15/343,215

(22) Filed: Nov. 4, 2016

(65) Prior Publication Data
US 2017/0132451 A1 May 11, 2017

(30) Foreign Application Priority Data

Nov. 6, 2015 (JP) .............................. JP2015-218357

(51) Int. Cl.
*G06K 9/68* (2006.01)
*G06K 9/00* (2006.01)
(Continued)

(52) U.S. Cl.
CPC .......... *G06K 9/00208* (2013.01); *G06K 9/46* (2013.01); *G06K 9/4604* (2013.01); *G06K 9/468* (2013.01);
(Continued)

(58) Field of Classification Search
CPC .. G06K 9/00201; G06K 9/00208; G06K 9/46; G06K 9/4604; G06K 9/4671;
(Continued)

(56) References Cited

U.S. PATENT DOCUMENTS 5,881,170 A * 3/1999 Araki ...................... G06T 7/149
382/199
7,065,242 B2 * 6/2006 Petrov ...................... G06K 9/20
382/285
(Continued)

FOREIGN PATENT DOCUMENTS

JP 7-37085 A 2/1995
JP 2008-58090 A 3/2008
(Continued)

OTHER PUBLICATIONS

T. F. Cootes, C. J. Taylor, D. H. Cooper, and J. Graham, "Active Shape Models-Their Training and Application", Computer Vision and Image Understanding, vol. 61, No. 1, Jan. 1995, pp. 38-59 (Year: 1995).*

(Continued)

*Primary Examiner* — Eric Rush
(74) *Attorney, Agent, or Firm* — Hauptman Ham, LLP

(57) ABSTRACT

An image processing device that detects an image of an object from input data captured by a vision sensor, on the basis of a model pattern including a set of a plurality of first feature points representing the shape of the object, includes an object detection unit that detects images of the object by matching between a plurality of second feature points extracted from the input data and a plurality of first feature points forming the model pattern, a corresponding point selection unit that selects, for each image of the object, second feature points corresponding to the first feature points and stores the selected second feature points as corresponding points, and a model pattern correction unit that calculates a statistic of a predetermined physical quantity of the plurality of corresponding points associated with each first feature point and corrects the first feature point on the basis of the statistic.

1 Claim, 17 Drawing Sheets

(51) Int. Cl.
  *G06K 9/62* (2006.01)
  *G06T 7/77* (2017.01)
  *G06K 9/46* (2006.01)
  *G06T 7/73* (2017.01)
  *G06K 9/48* (2006.01)

(52) U.S. Cl.
  CPC ......... *G06K 9/6202* (2013.01); *G06K 9/6204* (2013.01); *G06K 9/6211* (2013.01); *G06K 9/6212* (2013.01); *G06K 9/6254* (2013.01); *G06K 9/6255* (2013.01); *G06T 7/75* (2017.01); *G06T 7/77* (2017.01); *G06K 2009/487* (2013.01)

(58) Field of Classification Search
  CPC ............ G06K 9/468; G06K 9/48; G06K 9/62; G06K 9/6201; G06K 9/6202; G06K 9/6203; G06K 9/6204; G06K 9/6206; G06K 9/6207; G06K 9/6209; G06K 9/6211; G06K 9/6212; G06K 9/6217; G06K 9/6228; G06K 9/6254; G06K 9/6255; G06K 9/6256; G06K 2009/4666; G06K 2009/4695; G06K 2009/487; G06K 9/4609; G06T 7/00; G06T 7/0002; G06T 7/0004; G06T 7/001; G06T 7/50; G06T 7/55; G06T 7/70; G06T 7/73; G06T 7/74; G06T 7/75; G06T 7/77; G06T 2207/10004; G06T 2207/10028; G06T 2207/20081
  USPC ....... 382/100, 103, 141, 152–154, 159, 160, 382/181, 190, 195, 197, 199, 201, 203, 382/209, 217–219, 285
  See application file for complete search history.

(56) References Cited

U.S. PATENT DOCUMENTS

| | | | | |
|---|---|---|---|---|
| 7,340,089 | B2* | 3/2008 | Nair | G06K 9/6282 382/203 |
| 7,508,977 | B2* | 3/2009 | Lyons | G06K 9/32 382/154 |
| 8,885,923 | B2* | 11/2014 | Ishiyama | G06K 9/6255 382/190 |
| 9,594,942 | B2* | 3/2017 | Saklatvala | G06K 9/4604 |
| 9,646,201 | B1* | 5/2017 | Horowitz | G06K 9/00389 |
| 2003/0198388 | A1* | 10/2003 | Wenzel | G06K 9/6203 382/209 |
| 2004/0131247 | A1* | 7/2004 | Hiwada | G06K 9/00208 382/154 |
| 2006/0067573 | A1* | 3/2006 | Parr | G06K 9/00 382/154 |
| 2006/0110046 | A1* | 5/2006 | Luo | G06K 9/6204 382/203 |
| 2006/0210168 | A1* | 9/2006 | Kim | G06K 9/00275 382/203 |
| 2006/0221417 | A1* | 10/2006 | Fujieda | G06T 7/12 358/538 |
| 2007/0217683 | A1* | 9/2007 | Kinoshita | G06K 9/00214 382/190 |
| 2009/0041340 | A1* | 2/2009 | Suzuki | G06K 9/00288 382/159 |
| 2009/0262989 | A1* | 10/2009 | Kozakaya | G06K 9/00208 382/118 |
| 2009/0316990 | A1* | 12/2009 | Nakamura | G06K 9/4671 382/173 |
| 2010/0215255 | A1* | 8/2010 | Xiao | G06K 9/00281 382/159 |
| 2011/0001607 | A1* | 1/2011 | Kamakura | G06K 9/00087 340/5.82 |
| 2011/0110597 | A1* | 5/2011 | Abe | G06K 9/6203 382/199 |
| 2014/0050392 | A1* | 2/2014 | Feng | G06K 9/00281 382/159 |
| 2014/0294292 | A1* | 10/2014 | Aoba | G06K 9/00208 382/159 |
| 2014/0355886 | A1* | 12/2014 | Konishi | G06K 9/4609 382/195 |
| 2015/0009214 | A1* | 1/2015 | Lee | G06T 7/55 345/420 |
| 2015/0235380 | A1 | 8/2015 | Hayashi et al. | |
| 2016/0005161 | A1* | 1/2016 | Aiso | G06T 7/73 382/153 |
| 2016/0104314 | A1* | 4/2016 | Nakazato | G06T 7/50 382/285 |
| 2016/0189002 | A1* | 6/2016 | Kawakami | G06K 9/6211 382/218 |
| 2016/0196665 | A1* | 7/2016 | Abreu | G06K 9/00281 345/427 |
| 2016/0328834 | A1* | 11/2016 | Konishi | G06K 9/6203 |

FOREIGN PATENT DOCUMENTS

| | | |
|---|---|---|
| JP | 4843415 B2 | 12/2011 |
| JP | 5080416 B2 | 11/2012 |
| JP | 2012-248221 A | 12/2012 |
| JP | 2015-7972 A | 1/2015 |
| JP | 2015-133049 A | 7/2015 |
| WO | 2015/008798 A1 | 1/2015 |

OTHER PUBLICATIONS

David A. Forsyth, et al., "Computer Vision (: Modern Approach)", Kyoritsu Shuppan Co., Ltd., Jan. 2007, Japan, for which separated in 3 files.

David G. Lowe, "Object Recognition from Local Scale—Invariant Features," Proc. of the International Conference on Computer Vision, Sep. 20-21, 1999, Corfu, Greece.

D.H. Ballard, "Generalizing the Hough Transform to Detect Arbitrary Shapes", , Pattern Recognition vol. 13, No. 2, pp. 111-122, 1981, Pergarmon Press Ltd., U.K.

Martin A. Fischler, et al., "Random sample consensus: a paradigm for model fitting with applications to image analysis and automated cartography", Communications of the Association for Computing Machinery, vol. 24 No. 6, pp. 381-395, Jun. 1981, Mar. 1980, SRI International, CA, U.S.A.

Paul J. Besl, et al., "A method for Registration for 3-D Shapes", IEEE Transactions on Pattern Analysis and Machine Intelligence, vol. 14, No. 2, pp. 239-256, Feb. 1992, IEEE Computer Society Washington, DC, U.S.A.

Niloy J. Mitra, et al., "Estimating Surface Normals in Noisy Point Cloud Data", SCG'03 Proceedings of nineteenth annual symposium on Computational geometry, pp. 322-328, Jun. 8-10, 2003, San Diego, California, U.S.A.

Federico Tombari, et al., "Unique Signatures of Histograms for Local Surface Description", Federico Tombari, et al., Computer Vision, ECCV 2010, Part III. LNCS 6313, pp. 356-369, Sep. 5-11, 2010, Crete, Greece.

Federico Tombari, et al., "Object recognition in 3D scenes with occlusions and clutter by Hough voting", IEEE 2010 Fourth Pacific-Rim Symposium on Image and Video Technology, pp. 349-355, Nov. 14-17, 2010, Singapore.

* cited by examiner

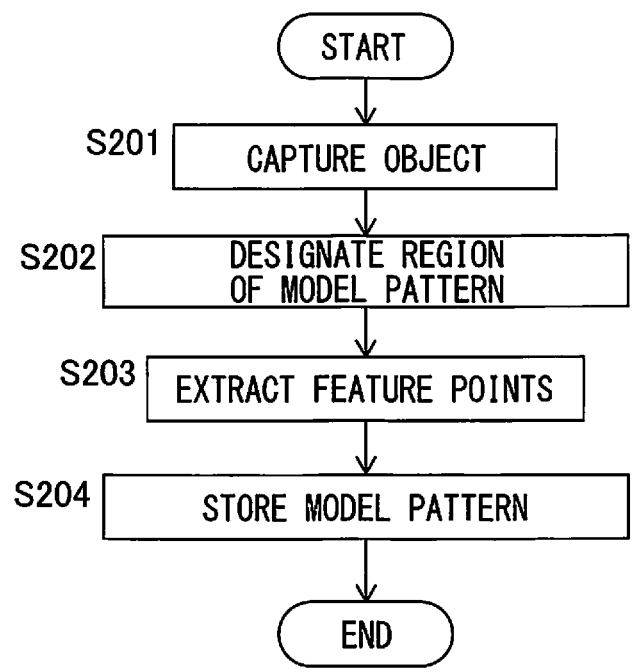
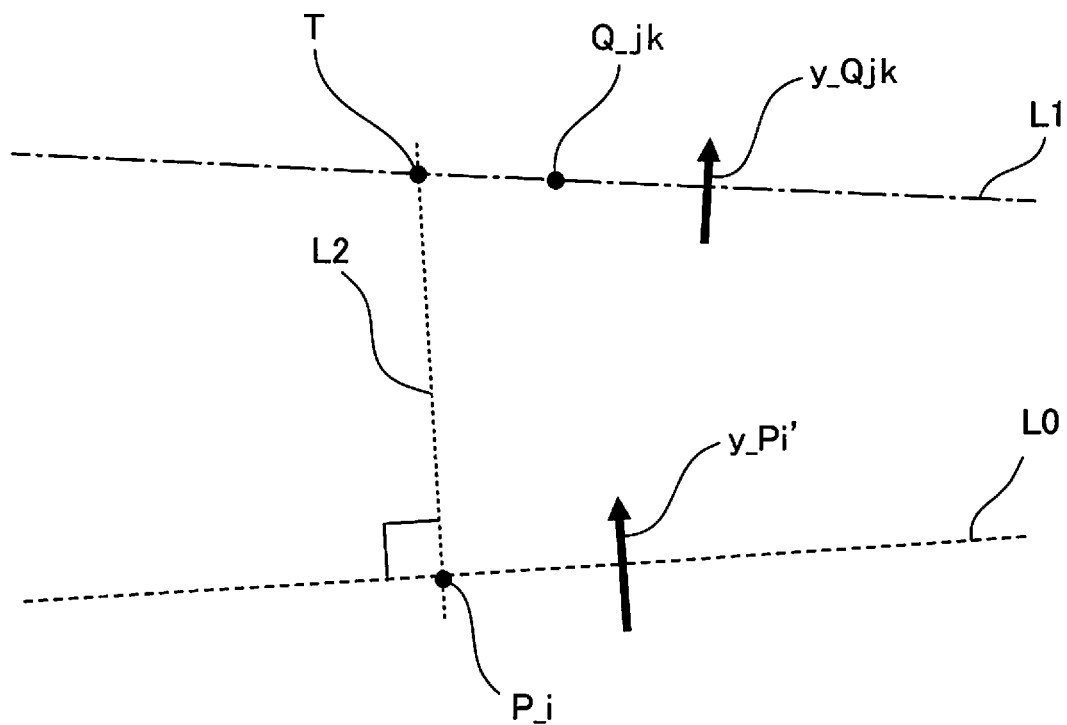

FIG. 13

| | MODEL PATTERN | DETECTION PATTERN 1 | ... | DETECTION PATTERN NT |
|---|---|---|---|---|
| FEATURE POINT P_1 | (tx_P1,ty_P1), (vx_P1, vy_P1) | (tx_O1m1, ty_O1m1), (vx_O1m1, vy_O1m1) | | (tx_O1mNT,ty_O1mNT), (vx_O1mNT, vy_O1mNT) |
| FEATURE POINT P_2 | (tx_P2,ty_P2), (vx_P2, vy_P2) | (tx_O2m1, ty_O2m1), (vx_O2m1, vy_O2m1) | | (tx_O2mNT,ty_O2mNT), (vx_O2mNT, vy_O2mNT) |
| ... | | | | |
| FEATURE POINT P_NP | (tx_PNP,ty_PNP), (vx_PNP, vy_PNP) | (tx_ONPm1, ty_ONPm1), (vx_ONPm1, vy_ONPm1) | | (tx_ONPmNT,ty_ONPmNT), (vx_ONPmNT, vy_ONPmNT) |

| | DISTANCE ERROR | LUMINANCE GRADIENT MAGNITUDE |
|---|---|---|
| FEATURE POINT P_1 | $d <= |d\_1|$ | $\alpha1\_min < \alpha < \alpha1\_max$ |
| FEATURE POINT P_2 | $d <= |d\_2|$ | $\alpha2\_min < \alpha < \alpha2\_max$ |
| ⋮ | | |
| FEATURE POINT P_NP | $d <= |d\_NP|$ | $\alpha NP\_min < \alpha < \alpha NP\_max$ |

FIG. 17

| | POSITION | POSTURE | LUMINANCE GRADIENT MAGNITUDE |
|---|---|---|---|
| FEATURE POINT P_1 | (tx_P1, ty_P1) | (vx_P1, vy_P1) | α_P1 |
| FEATURE POINT P_2 | (tx_P2, ty_P2) | (vx_P2, vy_P2) | α_P2 |
| ... | | | |
| FEATURE POINT P_NP | (tx_PNP, ty_PNP) | (vx_PNP, vy_PNP) | α_PNP |

FIG. 18

| | DETECTION PATTERN 1 | ... | DETECTION PATTERN NT |
|---|---|---|---|
| FEATURE POINT P_1 | (tx_V1m1, ty_V1m1) | | (tx_V1mNT, ty_V1mNT) |
| FEATURE POINT P_2 | (tx_V2m1, ty_V2m1) | | (tx_V2mNT, ty_V2mNT) |
| ... | | | |
| FEATURE POINT P_NP | (tx_VNPm1, ty_VNPm1) | | (tx_VNPmNT, ty_VNPmNT) |

IMAGE PROCESSING DEVICE AND METHOD FOR DETECTING IMAGE OF OBJECT TO BE DETECTED FROM INPUT DATA

RELATED APPLICATIONS

The present application claims priority to Japanese Patent Application Number 2015-218357 filed Nov. 6, 2015, the disclosure of which is hereby incorporated by reference herein in its entirety.

BACKGROUND OF THE INVENTION

1. Field of the Invention

The present invention relates to a device that uses feature points forming an image of an object as a model pattern and evaluates the degree of match between the model pattern and feature points extracted from input data to detect the position of the image of the object captured in the input data.

2. Description of the Related Art

When an image of a specific object is detected from input data captured by a vision sensor using an image processing device, it is a common practice to match feature points between reference information (commonly called, e.g., a model pattern or a template) representing the object and the input data captured by the vision sensor and determine that the object has been successfully detected when the degree of match is higher than a predetermined level.

When, for example, the vision sensor uses a camera and the input data represents a grayscale image, edge points are available as one type of feature point used in such matching. Edge points refer to points at which the luminance significantly changes in a picture image. Since the contour portions of an image of an object generally have significant changes in luminance, edge points are often used as feature points representing the contour edge shape of the object. A set of edge points extracted from a picture image including an object to be detected is stored as a model pattern, and the object is detected on the basis of the degree of match between a set of edge points extracted from a picture image captured by the vision sensor and the set of edge points forming the model pattern. Generalized Hough transformation, etc., are known as techniques of this type.

The shapes of the contour edges of images of an object captured in picture images vary. This is due, for example, to:
the individual differences in shape of the object
the large parallax The parallax means herein the deviation in positional relationship of contour edges captured in a picture image due to changes in relative position between an object and a vision sensor when the object is three-dimensional or has round-cornered edges.

It is desired to allow precise detection of an object even when the contour edges of the object have such variations. However, in practice, it is often the case that an individual of an object used to teach a model pattern or its picture image itself has deviated due to a variation and therefore has not been optimal for matching. In such a case, expected detection is impossible. For example, detection may be possible for a certain type of variation even when the variation is very large, while detection is impossible for another type of variation even when the variation is minor. Under the circumstances, in terms of applying the above-mentioned technique, an optimal model pattern according to variations expected to occur may be preferably generated.

In Japanese Patent No. 5080416, in detecting an object which matches a model from an input picture image, the degree of contribution of each feature amount of the model to the score in matching is accumulated. A method for removing undesired feature amounts on the basis of the accumulated degree of contribution is disclosed. The method disclosed in Japanese Patent No. 5080416 is used to correct a model from information concerning matching at the time of actual detection, but it may undesirably remove a model feature amount in a portion exhibiting large individual differences in shape of an object to be detected, because the portion has a low degree of contribution. Further, this method may not correct the shape of a model pattern to the one optimal for matching.

Japanese Unexamined Patent Publication (Kokai) No. 2015-7972 discloses a method for generating a plurality of variational picture images by applying various variations such as rotation, enlargement or reduction, deformation, changes in illumination, and image noise to a model picture image. Feature amounts of the pattern are extracted from the variational picture images to generate a feature amount distribution. The distribution can be used to generate a more robust model.

In the method disclosed in Japanese Unexamined Patent Publication (Kokai) No. 2015-7972, since variations are applied using an artificial method, variations due to factors associated with the actual individual differences or environments of an object to be detected may not be reflected on the model.

Japanese Patent No. 4843415 discloses a method for capturing the same object from the same point of view a plurality of times, performing detection for each of a plurality of picture images, and calculating the average position of detected contour edges to improve the detected position accuracy. This method is used to reduce the influence of measurement errors of the same object and therefore may not reduce the influence of variations in a plurality of objects to be detected.

Japanese Unexamined Patent Publication (Kokai) No. H7-37085 discloses a method for cutting a region which matches an initial reference pattern from a learning picture image as a partial picture image, and averaging a plurality of cut partial picture images for each pixel value to generate a new reference pattern. Averaging for each pixel can remove variations due to noise. However, in this method, when the positions of edges have variations due to the influence of the individual differences or the parallax, the luminance gradient may be low in the average picture image, resulting in inaccurate extraction of edges.

SUMMARY OF INVENTION

It is an object of the invention to allow precise detection of an object even when the shapes of the contour edges of images of the object captured in picture images vary.

The present invention provides an image processing device that detects an image of an object from input data captured by a vision sensor, on the basis of a model pattern including a set of a plurality of first feature points representing a shape of the object, the device including an object detection unit that detects, for each of at least one input data obtained by capturing the object, at least one image of the object by matching between a plurality of second feature points extracted from the input data and a plurality of first feature points forming the model pattern, a corresponding point selection unit that selects, for each of the at least one image of the object detected from the at least one input data, second feature points corresponding to the plurality of first feature points forming the model pattern from the plurality of second feature points forming the image and stores as corresponding points, the selected second feature points in association with the first feature points, and a model pattern correction unit that calculates, for each of the plurality of first feature points forming the model pattern, a statistic of a predetermined physical quantity of the plurality of corresponding points associated with the first feature point and corrects the first feature point on the basis of the calculated statistic of the predetermined physical quantity.

BRIEF DESCRIPTION OF THE DRAWINGS

The present invention will be understood more clearly by referring to the following accompanying drawings, in which:

FIG. 5 is a flowchart illustrating a procedure for generating a model pattern by an image processing unit;

FIG. 6 is a diagram for explaining an exemplary method for calculating the distance between the position of a first feature point and that of a second feature point;

FIG. 13 is a table illustrating the data format of corresponding points stored in a model pattern storage unit;

FIG. 17 is a table illustrating the data format of first feature points stored in the model pattern storage unit;

FIG. 18 is a table illustrating the data storage format of error vectors; and

DETAILED DESCRIPTION

First to third embodiments (in a description of common parts is sometimes simply referred to as an "embodiment" hereinafter) of the present invention will be described below with reference to the drawings. However, it should be understood that the present invention may be limited neither to the drawings nor to the following embodiments.

A description of an embodiment uses the following symbols. For the sake of clear explanation, the symbols will be described first.

NP: the number of first feature points forming a model pattern $P\_i$: the i-th first feature point (i=1 to NP) of the model pattern NI: the number of input picture images $I\_j$: the j-th input picture image (j=1 to NI)

$NQ\_j$: the number of second feature points extracted from the j-th input picture image $I\_j$ $Q\_jk$: the k-th second feature point (k=1 to $NQ\_j$) extracted from the j-th input picture image $I\_j$ $NT\_j$: the number of images of an object detected from the j-th input picture image $I\_j$ $T\_jg$: the g-th image (g=1 to $NT\_j$) of the object detected from the j-th input picture image $I\_j$ NT: the total number of images of the object detected from all input picture images (NT=Σ$NT\_j$)

$NO\_jg$: the number of feature points forming the image $T\_jg$ of the object of the second feature points $Q\_jk$ extracted from the j-th input picture image $I\_j$ ($NO\_jg<NQ\_j$)

$O\_jgn$: the n-th feature point (non-corresponding point) (n=1 to $NO\_jg$) of feature points other than the feature points forming the image $T\_jg$ of the object of the second feature points $Q\_jk$ extracted from the j-th input picture image $I\_j$ $NO\_i$: the number of corresponding points determined to correspond to the i-th feature point $P\_i$ of the model pattern ($NO\_i \leq NT$)

$O\_im$: the m-th corresponding point (m=1 to $NO\_i$) corresponding to the i-th feature point $P\_i$ of the model pattern NC: the number of feature point candidates $C\_h$: the h-th feature point candidate (h=1 to NC)

$NO\_h$: the number of corresponding points determined to correspond to the feature point candidate $C\_h$ ($NO\_h<NT$)

Figure 2:
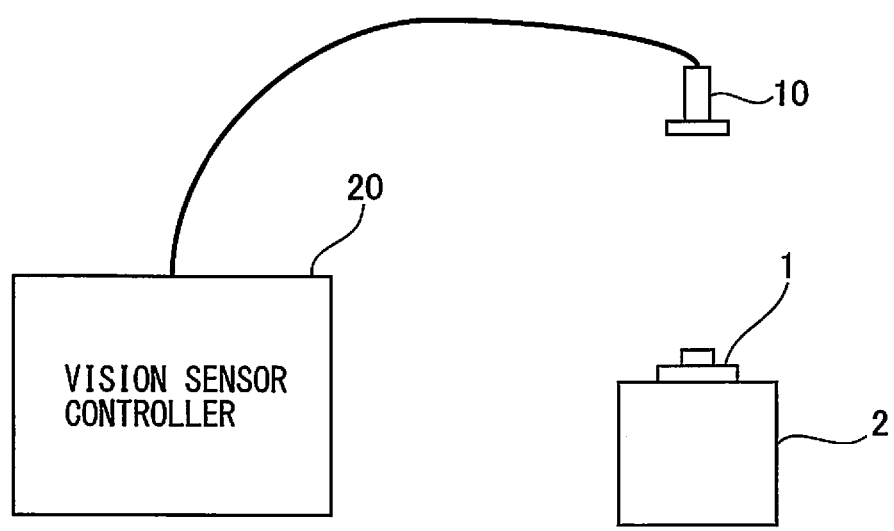
FIG. 2 is a diagram illustrating an exemplary configuration when the position of an object is detected by a vision sensor and the vision sensor controller including the image processing device according to an embodiment.

$O\_hp$: the p-th corresponding point (p=1 to $NO\_h$) corresponding to the feature point candidate $C\_h$ FIG. 2 is a diagram illustrating an exemplary configuration when the position of an object is detected by a vision sensor and a vision sensor controller including an image processing device according to an embodiment.

A vision sensor 10 is fixed at a position where it can capture an object 1 and the object 1 is placed on a worktable 2, as illustrated as FIG. 2. The vision sensor 10 may be implemented in either a camera that captures a grayscale image or a color image, or a stereo camera or a three-dimensional sensor that can obtain a range image or a set of three-dimensional points. A set of three-dimensional points on either the contour edges of the object or the plane of the object may be obtained.

This embodiment assumes that a camera is used as the vision sensor 10, which outputs a grayscale image. The camera is implemented in a digital camera including an image sensor such as a CCD (Charge Coupled Device), which serves as a well-known light-receiving device having the function of detecting a two-dimensional picture image on its image capturing plane (on its CCD array plane) by capturing an image. A two-dimensional coordinate system on the image capturing plane will be referred to as a picture image coordinate system hereinafter.

Figure 3:
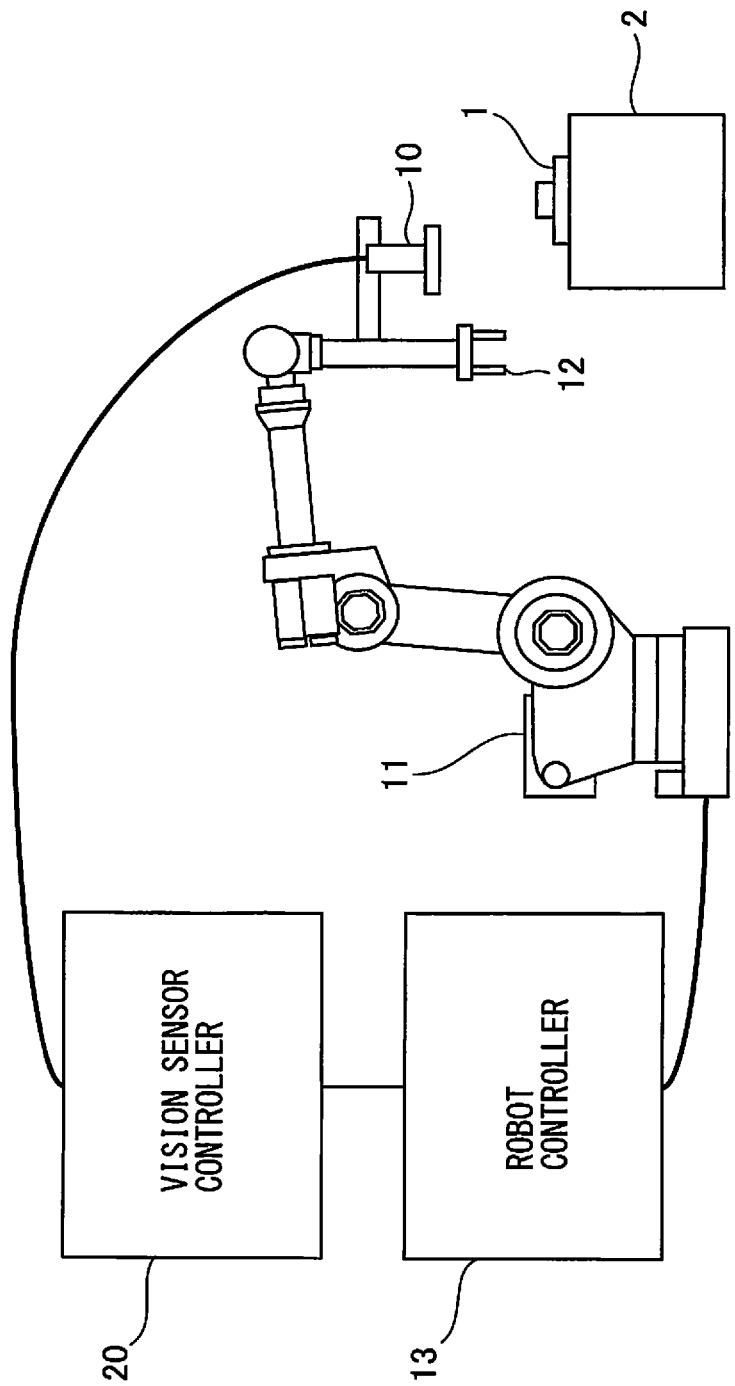
FIG. 3 is a diagram illustrating an exemplary configuration in which when an object on a worktable is handled by the hand of a robot controlled by a robot controller, a picture image captured by the vision sensor placed on the end effector of the robot is processed by the image processing device according to the embodiment mounted in the vision sensor controller to detect the object, and the position information of the detected object is provided to the robot controller.

FIG. 3 is a diagram illustrating an exemplary configuration in which when the object 1 on the worktable 2 is handled by a hand 12 of a robot 11 controlled by a robot controller 13, a picture image captured by the vision sensor 10 placed on the end effector of the robot 11 is processed by the image processing device according to the embodiment mounted in a vision sensor controller 20 to detect the object 1, and the position information of the detected object 1 is provided to the robot controller 13. The vision sensor 10 may be located on a movable portion such as the end effector of the robot 11, as illustrated as FIG. 3.

Figure 1:
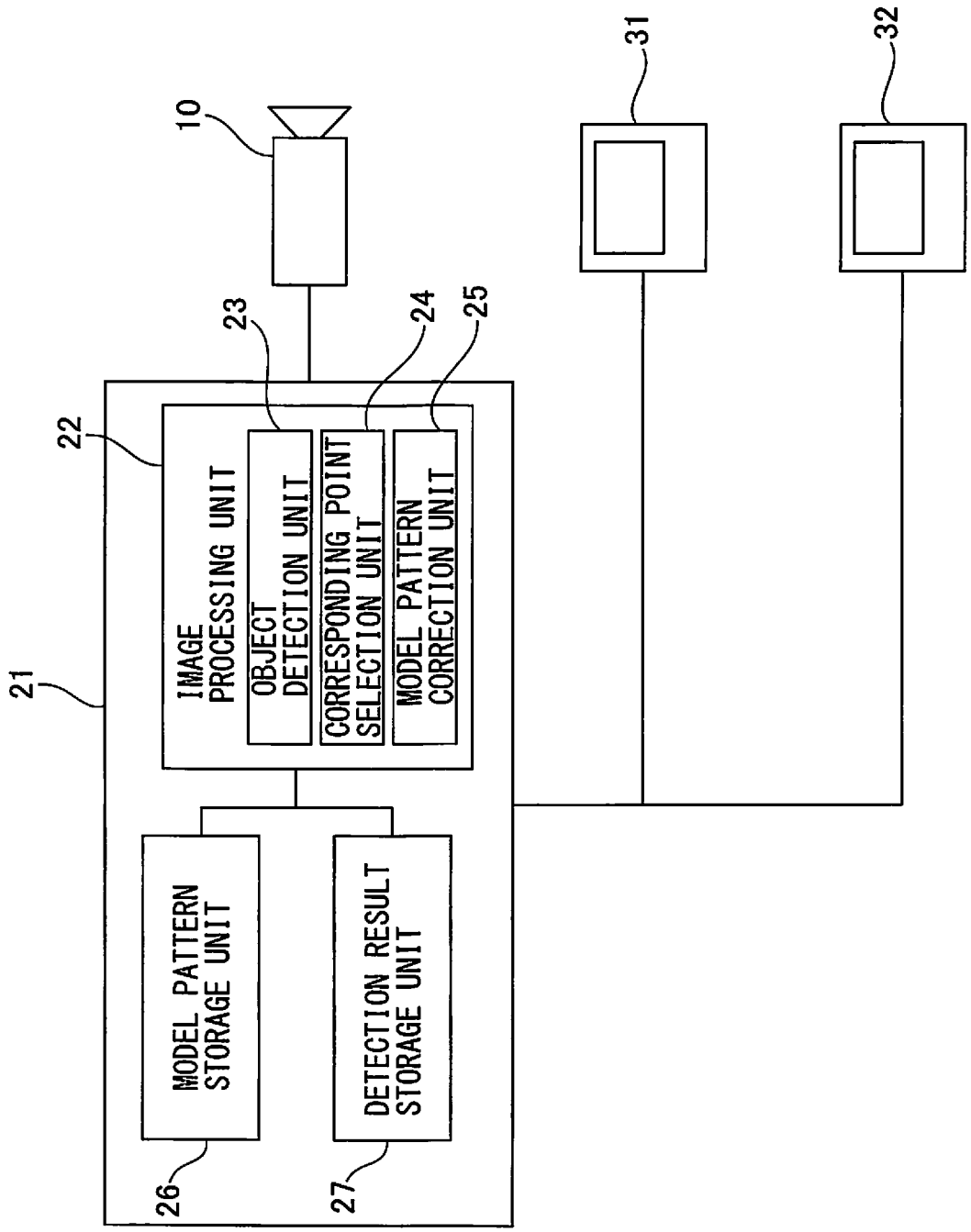
FIG. 1 is a block diagram illustrating the configuration of an image processing device mounted in a vision sensor controller.

FIG. 1 is a block diagram illustrating the configuration of the image processing device mounted in the vision sensor controller.

An image processing device 21 includes an image processing unit 22, a model pattern storage unit 26, and a detection result storage unit 27, as illustrated as FIG. 1. The image processing device 21 is connected to, e.g., the vision sensor 10, a console panel 31, and a display 32. The image processing unit 22 includes an object detection unit 23, a corresponding point selection unit 24, and a model pattern correction unit 25. The model pattern storage unit 26 stores a taught model pattern. The detection result storage unit 27 stores the result of detection of the object from input data using the taught model pattern. Each part included in the image processing device 21 is implemented as software on a computer including, e.g., a CPU, a ROM, and a RAM. First to third embodiments (to be described later) are different from each other in terms of the details of processing implemented as software.

The vision sensor 10 is connected to the image processing device 21 via a communication cable. The vision sensor 10 provides captured picture image data to the image processing device 21. The console panel 31 is connected to the image processing device 21 via a communication cable. The console panel 31 is used to perform setting of the vision sensor 10 preferably involved in detecting the object 1 by the image processing device 21. The display 32 is connected to the image processing device 21 via a communication cable. The display 32 displays a picture image captured by the vision sensor 10 and details settings on the console panel 31. The vision sensor 10, the console panel 31, and the display 32 may be integrated with the image processing device 21.

Figure 4:
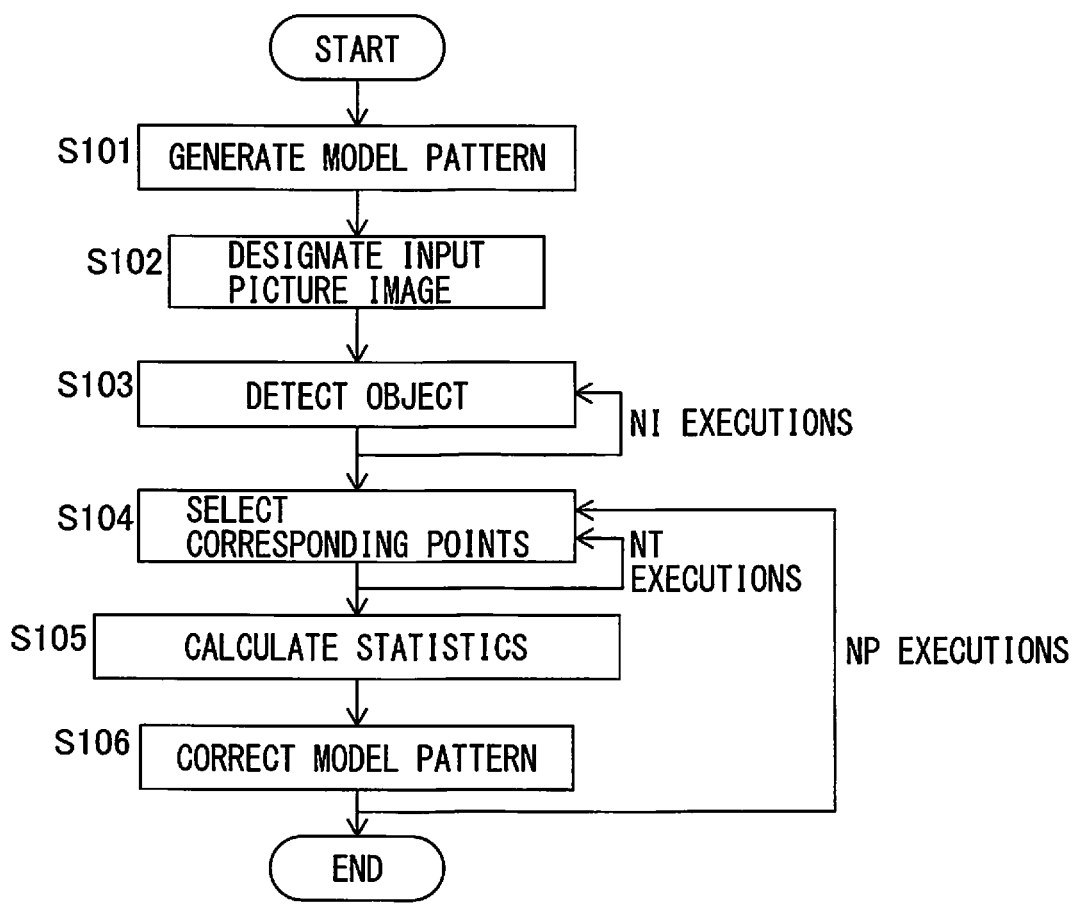
FIG. 4 is a flowchart illustrating processing according to a first embodiment.

FIG. 4 is a flowchart illustrating processing in the image processing device 21 according to a first embodiment.

The details of processing performed by the image processing unit 22 in the first embodiment will be described below with reference to FIG. 4.

In step S101, the image processing unit 22 generates a model pattern and stores the generated model pattern in the model pattern storage unit 26.

The model pattern in this embodiment is formed by a plurality of feature points. Although various points are available as feature points, edge points are used as feature points in this embodiment. Edge points have high luminance gradients in a picture image and may be used to obtain the contour shape of the object 1. Since a method for extracting edge points is described in, e.g., "Computer Vision," Kyoritsu Shuppan Co., Ltd., January 2007 and is well-known, a description thereof will not be given herein.

Examples of the physical quantities of an edge point include the position, luminance gradient direction, and luminance gradient magnitude of the edge point. Upon defining the luminance gradient direction of an edge point as the posture of a feature point, the posture can be combined with the position to define the position/posture of the feature point. In this embodiment, as physical quantities of a feature point, the physical quantities of an edge point, i.e., the position, posture (luminance gradient direction), and luminance gradient magnitude of the edge point are stored.

Figure 11:
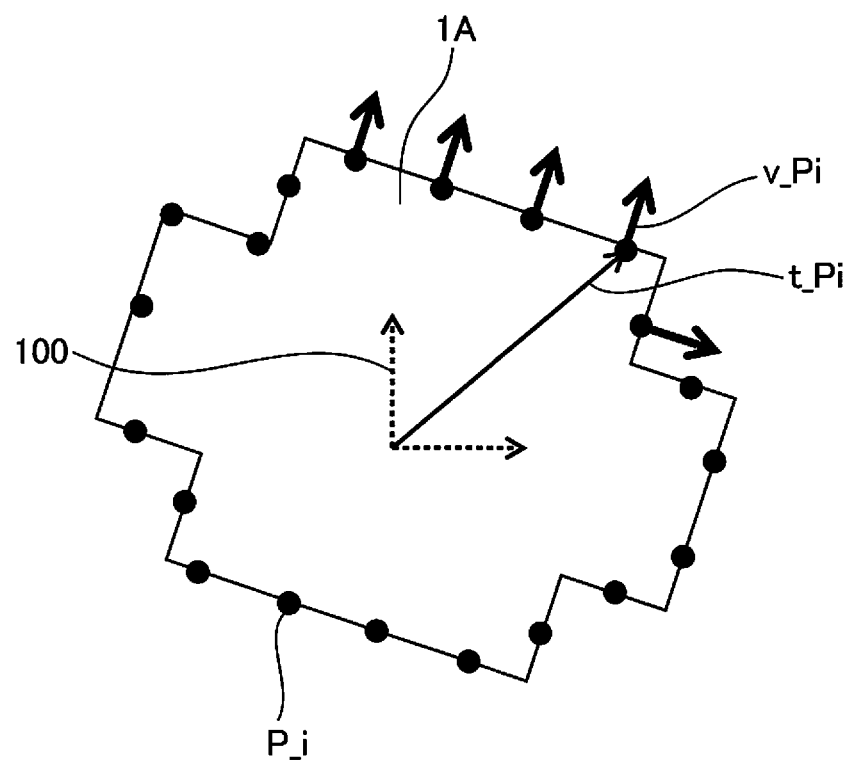
FIG. 11 is a diagram illustrating an exemplary model pattern of the object.

FIG. 11 is a diagram illustrating an exemplary model pattern of the object 1. The model pattern of the object 1 is formed by a plurality of first feature points P_i (i=1 to NP), as illustrated as FIG. 11.

The position/posture of the first feature point P_i forming the model pattern may be represented in any form, examples of which include a method for defining a coordinate system 100 (to be referred to as a model pattern coordinate system 100 hereinafter) for the model pattern and representing a position t_Pi (i=1 to NP) and a posture v_Pi (i=1 to NP) of a feature point forming the model pattern using, e.g., a position vector and a direction vector when viewed from the model pattern coordinate system 100.

The origin of the model pattern coordinate system 100 may be defined in any manner. For example, one arbitrary point may be selected from the first feature points forming the model pattern and defined as the origin or the barycenter of all feature points forming the model pattern may be defined as the origin.

The posture (axial direction) of the model pattern coordinate system 100 may also be defined in any manner. For example, the posture may be defined such that the model pattern coordinate system 100 is parallel to a picture image coordinate system in a picture image having been used to generate a model pattern, or two arbitrary points may be selected from the feature points forming the model pattern and may be defined such that the direction from one to the other of these two points coincides with the X-axis direction.

The first feature points P_i forming the model pattern are stored in the model pattern storage unit 26 in a form (including the position, the posture, and the luminance gradient magnitude) as illustrated as, e.g., FIG. 17.

FIG. 5 is a flowchart illustrating a procedure for generating a model pattern by the image processing unit 22.

In step S201, an object 1 to be taught as a model pattern is located within the field of view of the vision sensor (camera) 10 to capture a picture image of the object 1. The positional relationship between the camera 10 and the object 1 at this time is desirably set the same as in detection of the object 1.

In the picture image captured in step S202, the region capturing the object 1 is designated as a model pattern designation region using a rectangle or a circle.

Figure 12:
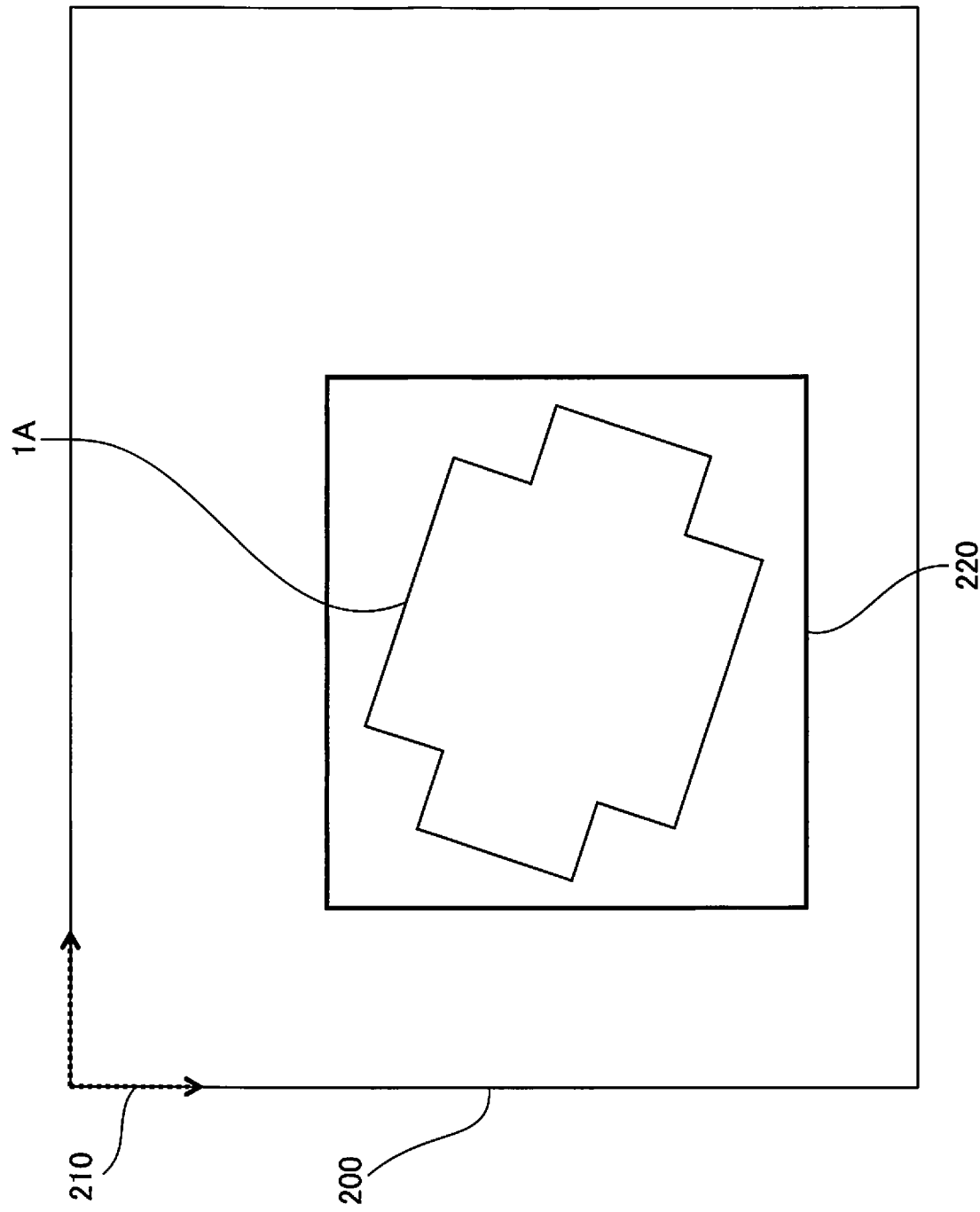
FIG. 12 is a view illustrating an exemplary model pattern designation region in a captured picture image.

FIG. 12 is a view illustrating an exemplary model pattern designation region in a captured picture image.

Referring to FIG. 12, a picture image coordinate system 210 is defined in a captured picture image and a model pattern designation region (in this case, a rectangular region) 220 is designated to include an image 1A of the object 1 in the picture image coordinate system 210. The model pattern designation region 220 may be set by the image processing unit 22 in response to an instruction input via the console panel 31 by the user while he or she browses a picture image on the display 32, or a portion having a high luminance gradient in the captured picture image may be obtained as the contour of an image 1A by the image processing unit 22 so that the model pattern designation region 220 is automatically designated to include the image 1A.

In step S203, edge points are extracted as feature points within the range of the model pattern designation region 220 to obtain physical quantities such as the positions, postures (luminance gradient directions), and luminance gradient magnitudes of the edge points. A model pattern coordinate system 100 is defined in the designated region, and the positions and postures of the edge points are transformed from values represented in the picture image coordinate system 210 into values represented in the model pattern coordinate system 100.

In step S204, the physical quantities of the extracted edge points are stored in the model pattern storage unit 26 as first feature points P_i forming the model pattern.

Although edge points are used as feature points in this embodiment, the feature points applicable in this embodiment are not limited to edge points and feature points such as SIFT may be used. A method for extracting SIFT feature points from picture images is described in, e.g., David G. Lowe, "Object Recognition from Local Scale-Invariant Features," Proc. of the International Conference on Computer Vision, Corfu (September 1999) and is well-known.

Instead of extracting, e.g., edge points or SIFT feature points from a picture image of the object 1 and setting them as first feature points forming the model pattern, geometries such as segments, rectangles, or circles may be located in conformity to the contour edges of the object captured in a picture image to generate a model pattern. In this case, feature points may be preferably located with appropriate spaces between them on the geometry forming the contour edges.

A model pattern can also be generated on the basis of, e.g., CAD data. For two-dimensional CAD data, a model pattern can be generated using the same method as that which uses geometries. For three-dimensional CAD data, it may be preferable to project the shape of an object represented by the CAD data onto a picture image, extract feature points from the projected image, and set them as first feature points. Transformation can be done by, e.g., the following processes.

1. A local coordinate system is defined with its origin on the image capturing plane of a camera.

2. The camera is calibrated in advance. This can transform three-dimensional points represented in the local coordinate system into two-dimensional points in a camera picture image.

3. An object represented in the local coordinate system as CAD data is virtually placed. The placed CAD data is represented in the local coordinate system. The relative relationship between the camera and the object is set approximately the same as that used in actually detecting the object.

4. A set of three-dimensional points on contour edges is obtained from the contour edges at a predetermined interval. Contour edges used as a model pattern are designated from the CAD data as appropriate.

5. The set of three-dimensional points is projected onto the camera picture image to obtain a set of two-dimensional points in the picture image coordinate system. Designating the direction of a light and dark pattern on the CAD data allows addition of even the luminance gradient direction. The direction of a light and dark pattern refers to information indicating which of two regions divided by a contour edge as a boundary is lighter.

6. The obtained set of two-dimensional points in the picture image coordinate system is transformed to be represented in a model pattern coordinate system and is stored in the model pattern storage unit as first feature points.

Referring back to step S102, one or more input picture images I_j (j=1 to NI) including the image 1A of the object 1 are provided. The image 1A of the object 1 captured in the input picture image I_j desirably involves variations of interest in detection. When, for example, the individual differences of the object 1 are of interest, a plurality of objects 1 having individual differences are preferably provided to use captured images of the objects 1 as input picture images. When the difference in vision that depends on the position where the object 1 is placed is of interest, picture images obtained by capturing the object as placed in various positions/orientations within the field of view of the camera are preferably used as input picture images. A large number of picture images of the object 1 actually captured on a production line may be stored and used as input picture images. Picture images actually captured on a production line involve a variety of variations to be taken into consideration and are therefore suitable. A plurality of objects may be captured in one input picture image.

In step S103, the image 1A of the object 1 (to be sometimes simply referred to as the object 1 hereinafter) is detected for each input picture image I_j (j=1 to NI).

Second feature points are extracted from the input picture image I_j first. Second feature points may be preferably extracted using the same method as that used to extract first feature points in generating a model pattern. In this embodiment, edge points are extracted from the input picture image and set as second feature points. For the sake of convenience, NQ_j second feature points extracted from the input picture image I_j are defined as Q_jk (k=1 to NQ_j). The second feature points Q_jk are stored in the detection result storage unit 27 in association with the input picture image I_j. At this point in time, the positions/postures of the second feature points Q_jk are represented in the picture image coordinate system 210.

The object 1 is detected by matching between the second feature points Q_jk extracted from the input picture image I_j and the first feature points P_i forming the model pattern. Although various methods are available to detect the object, examples of available well-known methods include the generalized Hough transformation described in D. H. Ballard, "Generalizing the Hough Transform to Detect Arbitrary Shapes," Pattern Recognition Vol. 13, No. 2, pp. 111-122, 1981, RANSAC described in Martin A. Fischler, et al., "Random sample consensus: a paradigm for model fitting with applications to image analysis and automated cartography," Communications of the Association for Computing Machinery Vol. 24, No. 6, Pages 381-395, March 1980, and the ICP algorithm described in Paul J. Best, et al., "A method for Registration for 3-D Shapes," IEEE Transactions on Pattern Analysis and Machine Intelligence, Vol. 14, No. 2, February 1992.

As a result of detection, NT_j images of the object have been detected from the input picture image I_j. Let T_jg (g=1 to NT_j) be the detected image and R_Tjg be the detection position of the image T_jg. The detection position R_Tjg is a homogeneous transform matrix representing the position/posture of the image T_jg of the object when viewed from the picture image coordinate system 210, i.e., the position/posture of the model pattern coordinate system 100 when viewed from the picture image coordinate system 210 at the time of superimposition of the model pattern on the image T_jg, and is given by:

$$R\_Tjg = \begin{bmatrix} a_{00} & a_{01} & a_{02} \\ a_{10} & a_{11} & a_{12} \\ 0 & 0 & 1 \end{bmatrix}$$

When, for example, the object is not tilted with respect to the optical axis of the camera and it suffices to take only congruent transformation into consideration as movement of an image of the object captured in a picture image, $a_{00}$ to $a_{12}$ are given by:

$a_{00} = \cos \theta$
$a_{01} = -\sin \theta$
$a_{02} = x$
$a_{10} = \sin \theta$
$a_{11} = \cos \theta$
$a_{12} = y$ where (x, y) is the position on the picture image and $\theta$ is the amount of rotation on the picture image.

When the object is not tilted with respect to the optical axis of the camera while the distance between the object and the camera is not constant, the size of an image of the object captured in a picture image changes depending on the distance, and similarity transformation is applicable as movement of an image of the object captured in a picture image. In this case, $a_{00}$ to $a_{12}$ are given by:

$a_{00} = s \cdot \cos \theta$
$a_{01} = -s \cdot \sin \theta$
$a_{02} = x$
$a_{10} = s \cdot \sin \theta$
$a_{11} = s \cdot \cos \theta$
$a_{12} = y$ where s is the ratio between the size of the taught model pattern and that of the image T_jg of the object.

The same processing is performed for each input picture image I_j (j=1 to NI) and a total of NT images have been detected. The total number NT is given by:

$$NT = \sum_{j=0}^{NI} NT\_j$$

The detection positions R_Tjg are stored in the detection result storage unit 27 in association with the input picture image I_j.

In step S104, of the second feature points Q_jk (j=1 to NI, k=1 to NQ_j) extracted from the input picture image I_j, second feature points Q_jk corresponding to the first feature points P_i forming the model pattern are selected as corresponding points on the basis of the detection position R_Tjg of the image T_jg (j=1 to NI, g=1 to NT_j) of the object detected from each input picture image I_j (j=1 to NI).

For the sake of convenience, the position/posture of each first feature point P_i forming the model pattern is represented by a homogeneous transform matrix R_Pi. R_Pi can be expressed as:

$$R\_Pi = \begin{bmatrix} b_{00} & b_{01} & b_{02} \\ b_{10} & b_{11} & b_{12} \\ 0 & 0 & 1 \end{bmatrix}$$

$b_{00} = vx\_Pi$
$b_{01} = -vy\_Pi$
$b_{02} = tx\_Pi$
$b_{10} = vy\_Pi$
$b_{11} = vx\_Pi$
$b_{12} = ty\_Pi$ where t_Pi=(tx_Pi, ty_Pi) is the position of P_i in the model pattern coordinate system and v_Pi=(vx_Pi, vy_Pi) is the posture of P_i in the model pattern coordinate system.

The posture of P_i can also be represented by an angle r_Pi in place of a vector. v_Pi can be represented using r_Pi as v_Pi=(vx_Pi, vy_Pi)=(cos r_Pi, sin r_Pi).

Similarly, the position/posture of each second feature point Q_jk extracted from the input picture image I_j is also represented by a homogeneous transform matrix R_Qjk.

Note that the position/posture R_Pi of the first feature point P_i forming the model pattern is represented in a model pattern coordinate system and the position/posture R_Qjk of the second feature point Q_jk extracted from the input picture image I_j is represented in a picture image coordinate system. The relationship between these two coordinate systems is clearly defined.

Letting R_Pi' be the position/posture of the first feature point P_i when viewed from the picture image coordinate system at the time of superimposition of the model pattern on the image T_jg of the object captured in the picture image I_j, R_Pi' can be expressed using the position/posture R_Pi of the first feature point P_i when viewed from the model pattern coordinate system and the detection position R_Tjg of the image T_jg when viewed from the picture image coordinate system, as:

$$R\_Pi' = R\_Tjg \cdot R\_Pi \quad (1)$$

Similarly, letting R_Qjk' be the position/posture of the second feature point Q_jk when viewed from the model pattern coordinate system at the time of superimposition of the model pattern on the image T_jg of the object, R_Qjk' can be expressed using the position/posture R_Qjk of Q_jk when viewed from the picture image coordinate system and the detection position R_Tjg of the image T_jg when viewed from the picture image coordinate system, as:

$$R\_Qjk' = R\_Tjg^{-1} \cdot R\_Qjk \quad (2)$$

For the sake of later convenience, let t_Pi' be the position of P_i when viewed from the picture image coordinate system, v_Pi' be the posture of P_i when viewed from the picture image coordinate system, t_Qjk be the position of Q_jk when viewed from the picture image coordinate system, v_Qjk be the posture of Q_jk when viewed from the picture image coordinate system, t_Qjk' be the position of Q_jk when viewed from the model pattern coordinate system, and v_Qjk' be the posture of Q_jk when viewed from the model pattern coordinate system.

In view of the foregoing description, the first feature points P_i forming the model pattern and the second feature points Q_jk (j=1 to NI, k=1 to NQ_j) extracted from the input picture image I_j are associated with each other in accordance with the following procedure:

1. The position/posture R_Pi of the first feature point P_i forming the model pattern is transformed into a position/posture R_Pi' when viewed from the picture image coordinate system in accordance with equation (1), on the basis of the detection position R_Tjg of the image T_jg of the object detected from the input picture image I_j.

2. For each first feature point P_i, one of the second feature points Q_jk closest to the first feature point P_i is searched for. The following method may be used in a search.

(a) The distances between the position/posture R_Pi' of the first feature point and the positions/postures R_Qjk of all second feature points are calculated and a second feature point Q_jk closest to the first feature point is selected.

(b) The position/posture R_Qjk of the second feature point is stored in an element, corresponding to a pixel at this position, of a two-dimensional array including elements equal in number to the number of pixels of the input picture image I_j, the vicinity of the pixel corresponding to the unique posture R_Pi of the first feature point in the two-dimensional array is two-dimensionally searched for, and the second feature point Q_jk found first is selected.

3. It is evaluated whether the selected second feature point Q_jk is appropriate as a corresponding point for the first feature point P_i. For example, the distance between the position/posture R_Pi' of the first feature point P_i and the position/posture R_Qjk of the second feature point Q_jk is calculated, and the selected second feature point Q_jk is determined to be appropriate as a corresponding point for the first feature point P_i when the obtained distance is equal to or smaller than a threshold.

The differences in physical quantities, such as posture and luminance gradient magnitude, between the first feature point P_i and the second feature point Q_jk are evaluated together, and a second feature point Q_jk selected when these differences are also equal to or smaller than, or equal to or larger than thresholds may be determined to be appropriate as a corresponding point for the first feature point P_i.

4. When the selected second feature point Q_jk is determined to be appropriate as a corresponding point for the first feature point P_i, this second feature point Q_jk is determined as a corresponding point O_im for the first feature point P_i and stored in the detection result storage unit 27 in association with P_i. A position/posture R_Oim of the corresponding point O_im as viewed from the picture image coordinate system satisfies R_Oim=R_Qjk, is the position/posture as viewed from the picture image coordinate system, and is therefore transformed into a position/posture R_Oim' as viewed from the model pattern coordinate system, and the position/posture R_Oim' is stored. From equation (2), R_Oim' can be calculated as:

$$R_{Oim}' = R_{Tji}^{-1} R_{Oim}$$

The distance between the position t_Pi' of the first feature point P_i and the position t_Qjk of the second feature point Q_jk may be determined using a direct distance between two points, but it may be determined using a value calculated using the following calculation method illustrated as FIG. 6.

1. A straight line which passes through the position t_Pi' of the first feature point P_i and is parallel to the posture v_Pi' of the first feature point P_i is defined as L2.

2. A straight line which passes through the position t_Qjk of the second feature point Q_jk and is perpendicular to the posture v_Qjk of the second feature point Q_jk is defined as L1.

3. A distance d_gi between an intersection T between L1 and L2 and the position t_Pi' of the first feature point P_i is calculated. In this case, the distance d_gi is signed.

When the distance is calculated in this manner, a deviation of a direction perpendicular to the luminance gradient direction of the first feature point P_i is ignored.

Upon the above-mentioned processing for each of NT detection positions R_Tjg (j=1 to NI, g=1 to NQ_j) detected from the input picture images I_j (j=1 to NI), NO_i corresponding points determined to correspond to the i-th first feature point P_i of the model pattern have been found. Let O_im (m=1 to NO_i) be the m-th corresponding point corresponding to the i-th first feature point P_i of the model pattern. Since the total number of images of the object detected from the input picture images I_j is NT, NO_i≤NT. The obtained corresponding points are stored in the model pattern storage unit 26 in a form as depicted as FIG. 13.

Although corresponding points are selected for all of NT detection positions R_Tjg (j=1 to NI, g=1 to NQ_j) in this embodiment, this processing may not always be done for all detection positions. When, for example, clearly inappropriate detection positions are mixed, they are desirably excluded. Exclusion can be performed using, e.g., the following method.

As an exemplary exclusion method, the luminance values in the vicinity of a detection position at the time of model pattern teaching and at the time of detection are compared with each other, and the detection position is determined to be inappropriate and is excluded when these luminance values are significantly different from each other. This exclusion processing will be described below.

1. A region where a luminance value is measured is set. This region will be referred to as a measurement region hereinafter. A measurement region may be located either inside or outside the model pattern. Although no particular limit is imposed on the shape of a measurement region, the measurement region is assumed to form a rectangle in this case and the position and size of the rectangle when viewed from the model pattern coordinate system are stored. Further, in a picture image obtained by teaching a model pattern, the statistic of the luminance value in the measurement region is calculated and stored together. Possible examples of the statistic include the average, variance, maximum, and minimum values of the luminance value.

2. A position R_C' of the measurement region corresponding to the detection position R_Tjg of the detection result T_jg is calculated.

When a position/posture R_C of the rectangle of the measurement region is defined, R_C' can be calculated on the basis of R_C and R_Tjg as:

$$R\_C' = R\_Tjg \cdot R\_C$$

3. The statistic of the luminance value of the input picture image I_j in the rectangular region defined by R_C' is calculated.

4. When the difference between the statistic of the luminance value in the measurement region of the model pattern and that of the luminance value in the measurement region of the detection result T_jg is equal to or larger than a threshold, this detection result is determined to be inappropriate and is excluded.

The above-mentioned processes in 2 to 4 are performed for each detection result T_jg (g=1 to NT_j).

The physical quantity used to determine exclusion or non-exclusion is not limited to the luminance value. For example, the luminance gradient magnitude in the measurement region may be used or the hue or saturation may be used. As long as the statistic of a physical quantity which may have an effect of this kind is calculated, the present invention is not limited to the examples given herein, as a matter of course.

As another exclusion method, the user can manually exclude an inappropriate detection result. A detection result is displayed on the display 32 and visually checked by the user to avoid the use of a detection result determined to be inappropriate. The above-mentioned processing (a check of the appropriateness of a detection result) is performed for each detection result T_jg (g=1 to NT_j).

Excluding inappropriate detection results can prevent such detection results from adversely affecting calculation of a statistic in the subsequent step.

In step S105, the statistic of the physical quantity of corresponding points corresponding to the first feature point P_i is calculated on the basis of the physical quantities at NO_i corresponding points O_im (m=1 to NO_i) determined to correspond to the i-th first feature point P_i forming the model pattern.

A method for obtaining an average error vector of the position of a feature point as an exemplary statistic will be described below.

(a) Positions/postures R_Oim', when viewed from the model pattern coordinate system, of NO_i corresponding points O_im corresponding to the first feature point P_i, stored in the detection result storage unit 27, are obtained.

Figure 14:
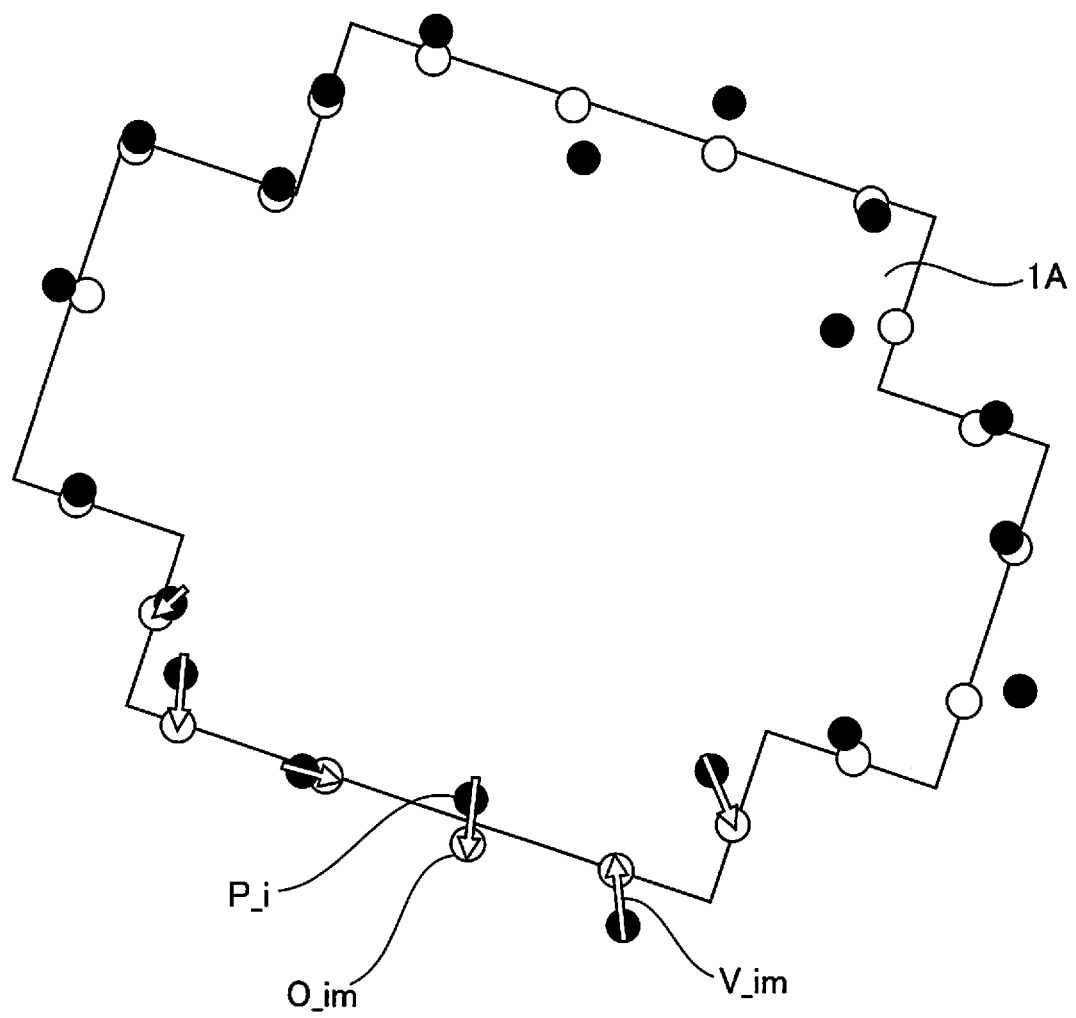
FIG. 14 is a diagram for explaining a method for calculating an error vector.

(b) As illustrated as FIG. 14, an error vector V_im is then calculated for each of the NO_i corresponding points O_im by subtracting the position component t_Pi of the position/posture R_Pi of the first feature point P_i from the position component t_Oim' of the position/posture R_Oim' of the corresponding point O_im. NO_i error vectors V_im are thus obtained. The obtained error vectors are stored in the model pattern storage unit 26 in a form as depicted as FIG. 18.

(c) All of the NO_i error vectors V_im are summed and the sum is divided by NO_i to calculate an average error vector V_i, which is stored in the model pattern storage unit 26 in association with the feature point P_i as the statistic of the first feature point P_i. V_i is given by:

$$V_i = \frac{1}{NO_i} \sum_{m=1}^{NO_i} V_{im}$$

Although all error vectors V_im for the first feature point P_i are stored in the model pattern storage unit and then their average is calculated in the above-mentioned example, an average error vector V_i may be obtained by sequentially adding error vectors V_im and finally dividing their sum by NO_i.

An average error vector can also be obtained using another method. For example, a probability distribution with NO_i error vectors as probability variables may be obtained to determine a vector in a portion having the highest probability as an average error vector. Since the picture image is two-dimensional, an average error vector can be calculated by estimating a two-dimensional probability distribution. Examples of the probability distribution include a normal distribution and a mixture of normal distributions.

Outliers may be removed before calculation of an average error vector. Removing outliers can prevent incorrect corresponding points from degrading the position accuracy of an average error vector. Outliers can be removed using, e.g., the following method.

A probability distribution with an error vector as a probability variable is obtained first. The probability that each error vector will be taken is calculated for the obtained probability distribution. Error vectors exhibiting such obtained probabilities which are lower than a threshold are removed as outliers.

After the outliers are removed, an average error vector may be preferably obtained by, e.g., obtaining a new probability distribution.

The above-mentioned processing is performed for all first feature points P_i forming the model pattern.

Figures 15, 16:
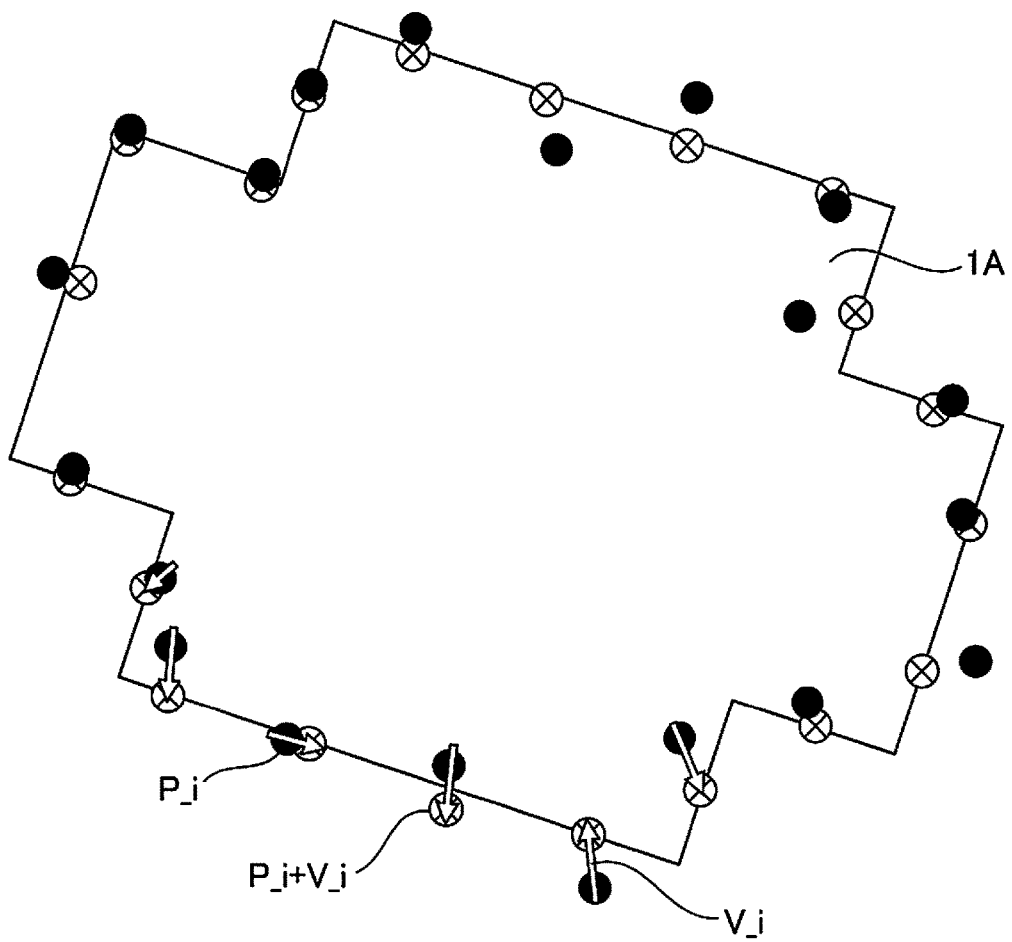
FIG. 15 is a diagram for explaining a method for correcting first feature points in the model pattern based on statistics.
FIG. 16 is a table illustrating the format of determination indices stored in the model pattern storage unit.

In step S106, the first feature points P_i of the model pattern are corrected on the basis of the obtained statistics (average error vectors V_i). More specifically, the position t_Pi of the feature point P_i may be preferably altered to the sum t_Pi+V_i of the average error vector V_i added to t_Pi, as illustrated as FIG. 15. Thus, the shape formed by the feature points P_i (i=1 to NP) of the model pattern becomes the average shape of NT images T_jg (j=1 to NI, g=1 to NT_j) captured in the picture images I_j (j=1 to NI).

The type of statistic calculated in step S105 and how to correct the model pattern in step S106 are not limited to the above-mentioned method. For example, the following method may be used.

1. A distance d_im between the first feature point P_i and the corresponding point O_im is calculated using the method illustrated as FIG. 6. d_im represents a signed distance. Since NO_i corresponding points exist for the first feature point P_i, NO_i distances d_im are calculated for each first feature point P_i.

2. An average d_i of the NO_i distances d_im is calculated in accordance with the following equation.

The obtained distance average d_i is stored in the model pattern storage unit in association with the feature point P_i as a statistic. The average d_i is given by:

$$d\_i = (\Sigma d\_im)/NO\_i$$

3. The posture v_Pi of the first feature point P_i is multiplied by d_i to obtain an average error vector V_i as:

$$V\_i = d\_i \cdot v\_Pi$$

The calculated average error vector V_i is added to the position t_Pi of the feature point P_i.

In doing this, the position t_Pi of the feature point P_i is corrected only in the luminance gradient direction.

Like the position t_Pi of the first feature point P_i of the model pattern, the posture v_Pi of the feature point P_i may be corrected. For example, an average vector uv_Oi of the posture vector v_Oi of the corresponding point O_im of the first feature point P_i may be obtained as uv_Oi=(Σv_Oim)/|Σv_Oim| and the posture vector v_Pi of the first feature point P_i may be replaced with uv_Oi.

Alternatively, the posture vector of the feature point P_i may be transformed into an angle r_Pi=arctan(vx_Pi/vy_Pi) and the angle of the posture of the corresponding point O_im obtained by similar transformation may be defined as r_Oim' to obtain a difference in angle r_im as r_Oim'−r_Pi. Note that r_im is transformed to take values of −π to π. The posture of the feature point P_i can be corrected by adding a difference average=r_i=(Σr_im)/(NO_i) to the angle r_Pi of the posture of the feature point.

The following advantageous effects can be obtained by correcting the model pattern in this way.

1. Since a model pattern generated from a picture image obtained by capturing a particular object reflects the shape of a particular individual of the object, it is not optimal for all individuals. The use of this method allows the average shape of the object to serve as a model pattern. The vision of the object may vary depending not only on the differences in shape in each individual of the object but also on the differences in camera position or position where the object is located. The model pattern can be averaged, including such differences in vision.

2. A model pattern generated from CAD data representing the shape of an object has an ideal shape of the object, but naturally it is not generated according to its measurements due to manufacturing errors. In addition, errors may occur upon transformation of a model pattern represented in a coordinate system based on the CAD data into a picture image coordinate system. Such a model pattern can be optimized in conformity to the shape of an object to be actually detected. The same applies when the contour edges of a model pattern are directly taught by combining geometries such as segments, rectangles, or circles with each other.

A first embodiment has been described above. A second embodiment will be described next.

In the second embodiment, even for second feature points which do not correspond to the first feature points of the model pattern, the statistics of the physical quantities of these corresponding points are obtained, and new first feature points are added to the model pattern on the basis of the obtained statistics.

Figure 7:
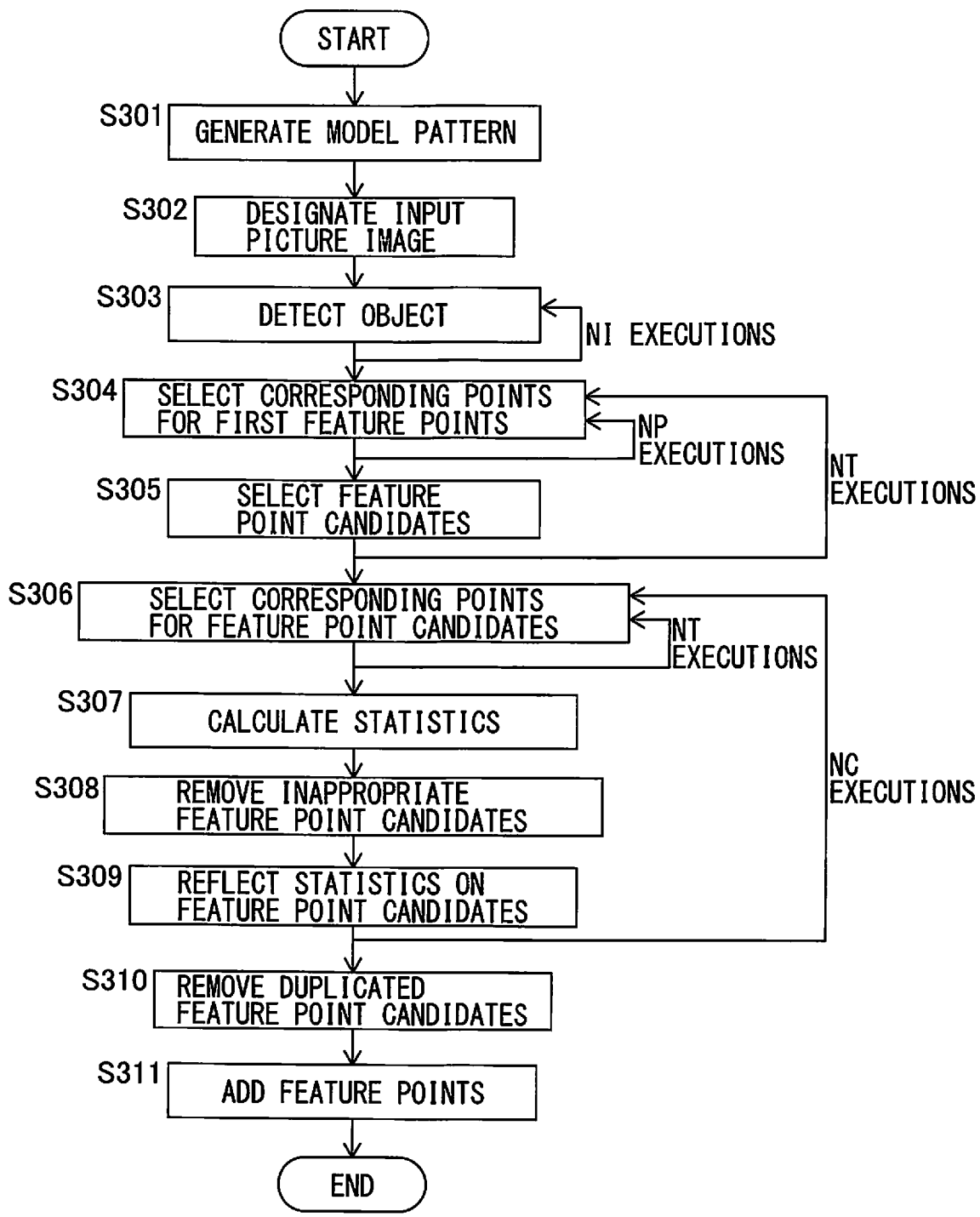
FIG. 7 is a flowchart illustrating processing according to a second embodiment.

FIG. 7 is a flowchart illustrating processing according to the second embodiment.

Steps S301 to S303 are the same as steps S101 to S103 in the first embodiment. With steps S301 to S303, NT_j images of the object have been detected from an input picture image I_j, as in the end of step S103. The detection position of a detected image T_jg (g=1 to NT_j) is defined as R_Tjg.

In step S304, a corresponding point selection unit 24 selects corresponding points corresponding to first feature points forming the model pattern. Although the process in step S304 is basically the same as that in step S104 of the first embodiment, they are different in that in the former the following additional operations are executed.

Figure 8:
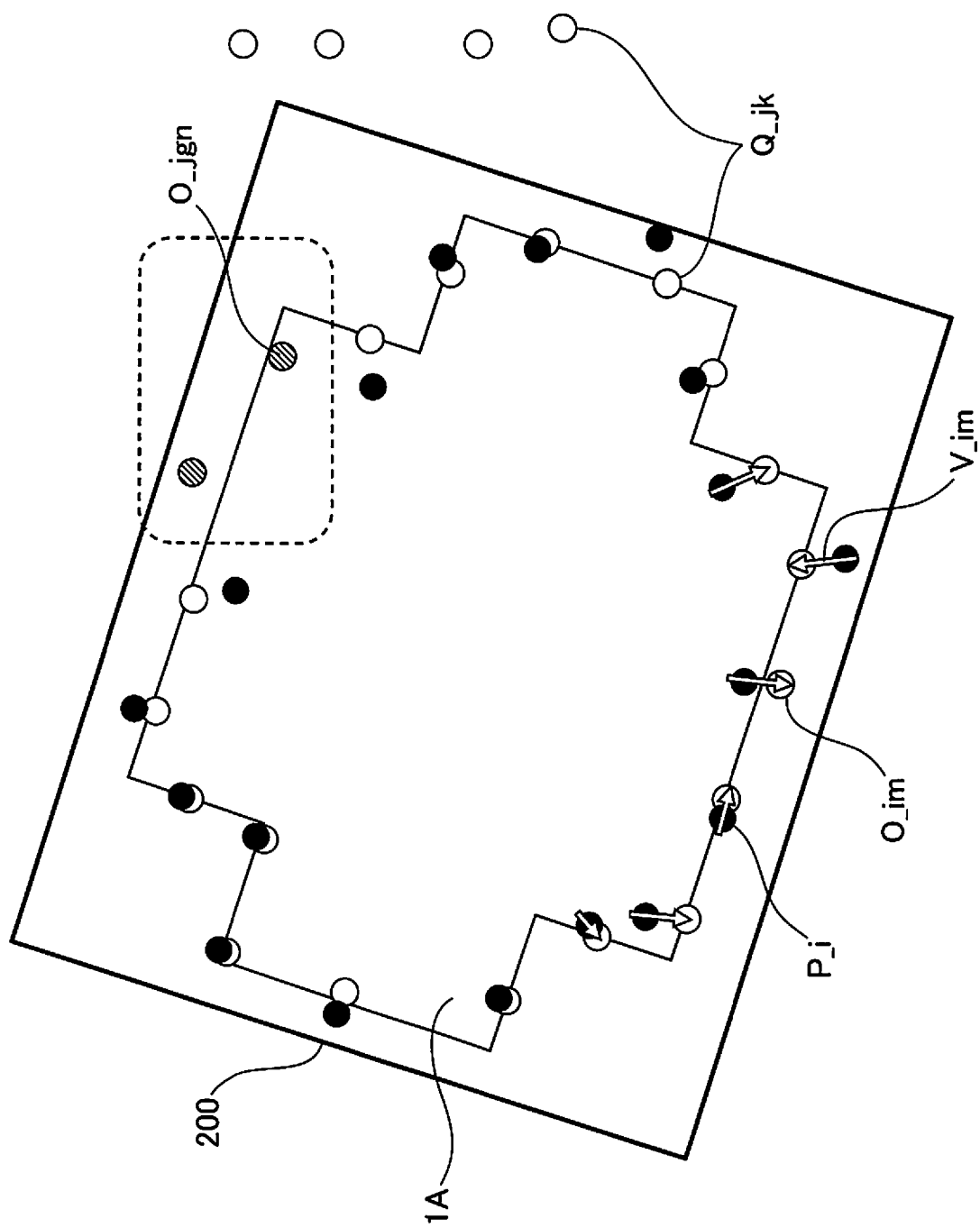
FIG. 8 is a diagram for explaining processing for selecting a feature point candidate.

As illustrated as FIG. 8, on the basis of the position/posture R_Tjg of the image T_jg of the object detected from the input picture image I_j, of second feature points Q_jk (j=1 to NI, k=1 to NQ_j) extracted from the input picture image I_j, second feature points Q_jk (points surrounded by a broken line in FIG. 8) other than those determined to correspond to first feature points P_i (i=1 to NP) forming the model pattern are stored in a detection result storage unit 27 in association with the image T_jg of the object, as non-corresponding points O_jgn (n=1 to NO_jg) of the image T_jg of the object. Note that NO_jg is a value equal to or less than NQ_j.

In step S305, the corresponding point selection unit 24 selects and stores feature point candidates in a model pattern storage unit 26 in accordance with the following procedure.

A position/posture R_Ojgn' of the non-corresponding point O_jgn when viewed from the model pattern coordinate system is calculated in accordance with above-mentioned equation (2) on the basis of the position/posture R_Ojgn of O_jgn when viewed from the picture image coordinate system and the position/posture R_Tjg of the image T_jg of the object, for each non-corresponding point O_jgn (n=1 to NO_jg) of the image T_jg of the object, stored in the detection result storage unit 27. It is checked whether R_Ojgn' falls within a model pattern designation region, and O_jgn is excluded from the non-corresponding points of the image T_jg of the object when R_Ojgn' falls outside this region. As the model pattern designation region used in this case, a region other than that used to generate a model pattern may be newly designated.

The remaining non-corresponding points are stored in association with the image T_jg of the object as feature point candidates C_h.

In adding as a feature point candidate, the physical quantity of the non-corresponding point O_jgn may be used to further narrow down the candidates. For example, no non-corresponding point having a luminance gradient magnitude smaller than a threshold may be added as a feature point candidate.

The processes in steps S304 and S305 are performed for each image T_jg (j=1 to NI, g=1 to NT_j) of the object detected from each input picture image I_j (j=1 to NI). Zero feature point candidate C_h initially exists, but a feature point candidate C_h is added every time the processes in steps S304 an S305 are performed and NC feature point candidates C_h (h=1 to NC) have been finally obtained.

In step S306, of the second feature points Q_jk (j=1 to NI, k=1 to NQ_j) extracted from the input picture image I_j, corresponding points O_hp (p=1 to NO_h) corresponding to the feature point candidates C_h (h=1 to NC) are selected on the basis of the position/posture R_Tjg (j=1 to NI, g=1 to NT_j) of the image of the object.

Although this process is basically the same as that in step S104 of the first embodiment, they are different in that in the former not a corresponding point corresponding to the first feature point P_i but a corresponding point corresponding to the feature point candidate C_h is selected. Since no corresponding point may be preferably selected for the image T_jg of the object used in adding the feature point candidate C_h, NO_h is equal to or less than NT−1.

Upon the process in step S306 for each image T_jg of the object detected from the input picture image I_j, NO_h corresponding points O_hp (p=1 to NO_h) have been found for each feature point candidate C_h.

In step S307, the statistic of the physical quantity of the corresponding points O_hp (p=1 to NO_h) is calculated for each feature point candidate C_h. In this case, when NO_h corresponding points correspond to a particular feature point candidate C_h, the ratio (NO_h+1)/NT of appearance of the relevant feature point in the images of the object to the total number NT of images of the object used to select corresponding points is calculated and determined as a statistic.

The statistic is not limited to this example and the following statistics, for example, may even be calculated.

The averages, variances, and probability distributions of the position errors, the errors in the luminance gradient direction, and the distances between the feature point candidates C_h and the corresponding points O_hp To calculate a statistic for the position/posture, a position/posture R_Ohp of the corresponding point O_hp may be preferably transformed into a position/posture R_Ohp' when viewed from the model pattern coordinate system. This can be done using above-mentioned equation (2).

The average, variance, and probability distribution of the luminance gradient magnitudes of the corresponding points O_hp The number NO_h of found corresponding points In step S308, it is determined on the basis of the calculated statistic whether adding each feature point candidate C_h (h=1 to NC) to the model pattern as a feature point is appropriate.

When, for example, NO_h corresponding points correspond to a particular feature point candidate C_h, the total number of images of the object used in selecting corresponding points is NT, and the ratio of appearance of the relevant feature point in the images of the object is therefore (NO_h+1)/NT. When the ratio of appearance of the relevant feature point in the images of the object is lower than a predetermined threshold, the feature point candidate may not be said to frequently appear in the images of the object, and adding this feature point candidate to the model pattern as a feature point may therefore be considered to be inappropriate.

When other statistics such as the variance of the positions or postures are used, and the variance of the positions or postures of the corresponding points O_hp (p=1 to NO_h) corresponding to a particular feature point candidate C_h is larger than a predetermined threshold, the particular feature point candidate may not be said to represent a feature point which stably appears in the images of the object, and adding this feature point candidate to the model pattern as a first feature point may therefore be considered to be inappropriate.

In step S309, the physical quantity of a feature point candidate C_h determined to be appropriate in step S308 of each feature point candidate C_h (h=1 to NC) is overwritten with the statistic of the physical quantity of the corresponding points O_hp (p=1 to NO_h) corresponding to the feature point candidate C_h. For example, the position, posture, luminance gradient magnitude, etc., of the feature point candidate C_h are overwritten with the averages of the position, posture, luminance gradient magnitude, etc., of the corresponding points O_hp (p=1 to NO_h).

With the above-mentioned processing, points having the same position/posture when viewed from the model pattern coordinate system are added as different feature point candidates. In step S310, duplicated points are removed from the feature point candidates C_h (h=1 to NC).

Figure 9:
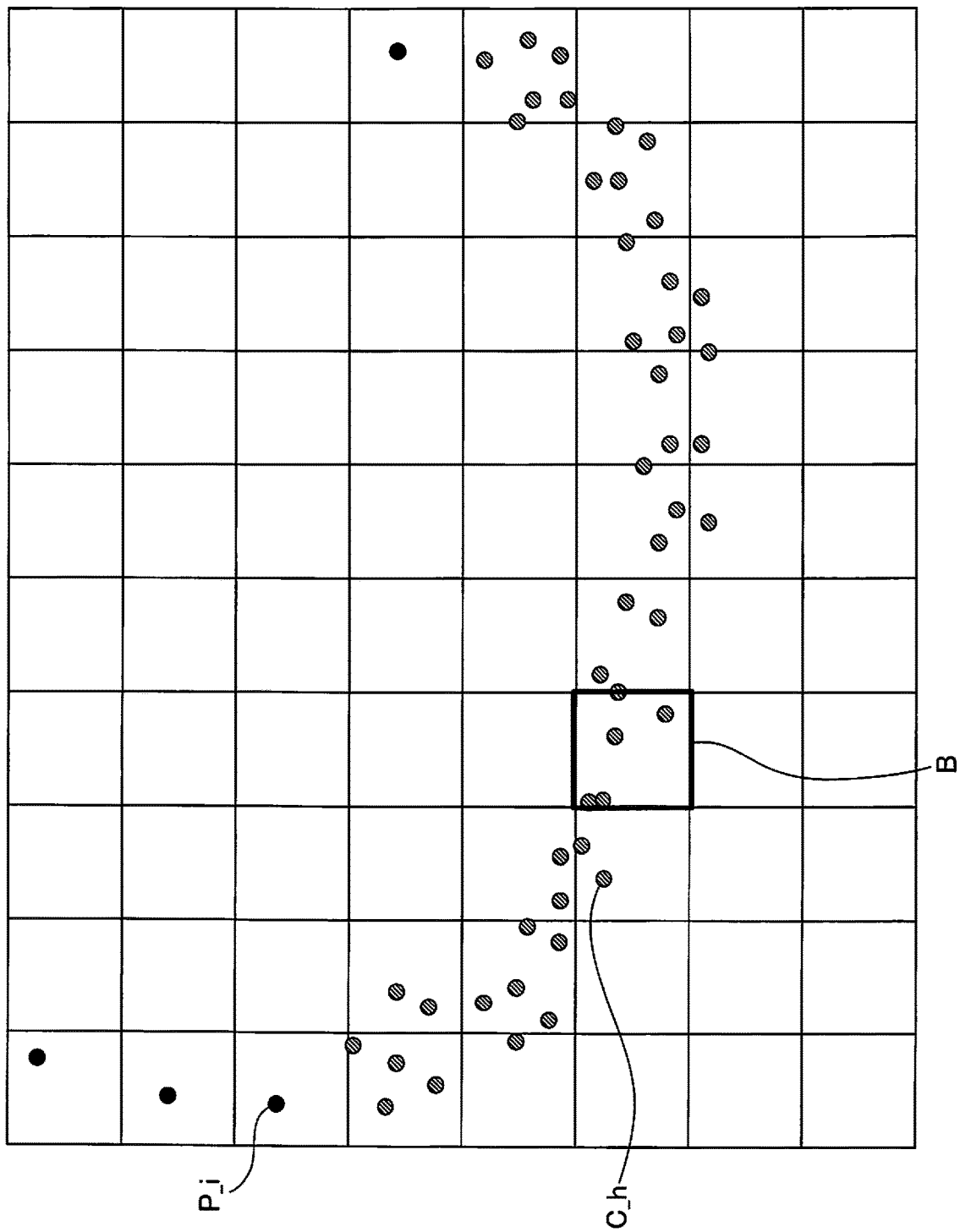
FIG. 9 is a diagram for explaining processing for removing duplicates from feature point candidates.

For example, as illustrated as FIG. 9, a two-dimensional space defined by the model pattern coordinate system is divided into blocks B for each pixel and feature point candidates are removed so that only one feature point candidate remains in each block. Although various methods are available as a criterion for removal, for example, a feature point candidate relevant to corresponding points found in large numbers may be made to remain, a feature point candidate having a high average of the luminance gradient magnitude may be made to remain, or these methods may be used in combination. In consideration of how the feature point candidate in question is linked to feature point candidates and first feature points in neighboring pixels, the highest appropriate feature point candidate may even be made to remain. When, for example, the luminance gradient directions of remaining feature point candidates are considerably different between neighboring pixels, either feature point candidate may be incorrect. This processing is performed for all blocks having feature point candidates.

In step S311, feature point candidates C_h (h=1 to NC) which have not been removed in the above-mentioned processing are added to the model pattern as first feature points and stored in the model pattern storage unit 26.

The second embodiment is not limited to the above-mentioned procedure and may be considered to take various forms.

For example, although second feature points Q_jk which correspond to none of the first feature points P_i are selected as non-corresponding points O_jgn in above-mentioned step S304, the second feature points Q_jk may be compared not only with the first feature points P_i but also the already added feature point candidates C_h so that second feature points Q_jk corresponding to first feature points P_i are selected as corresponding points for the feature points P_i, those corresponding to feature point candidates C_h are selected as corresponding points for the feature point candidates C_h, and those corresponding to neither first feature points P_i nor feature point candidates C_h are selected as non-corresponding points O_jgn. Thus, second feature points Q_jk which are more likely to be duplicates of second feature points already added as feature point candidates C_h are prevented from being added as feature point candidates C_h.

According to the second embodiment, second feature points which are absent in the initially generated model pattern but stably, frequently appear in the images of the object can be automatically added to the model pattern. This produces the following advantageous effects.

The initially generated model pattern includes only feature points extracted from one image of the object captured in one picture image, but feature points may not always be extracted from the entire object when a portion which is not captured while a conspicuous luminance gradient is present due, for example, to light variations or noise. Therefore, parts missing in the original model pattern can be compensated for by adding feature points which are not included in the original model pattern but appear in a large number of images of the object, using the method according to the second embodiment. This may improve the robustness and the accuracy of detection.

A third embodiment will be described next.

In the third embodiment, on the basis of the statistics of the physical quantities of corresponding points corresponding to a feature point forming a model pattern, determination indices are added to a first feature point forming the model pattern and used in an object detection unit 23 to improve the reliability of detection.

Figure 10:
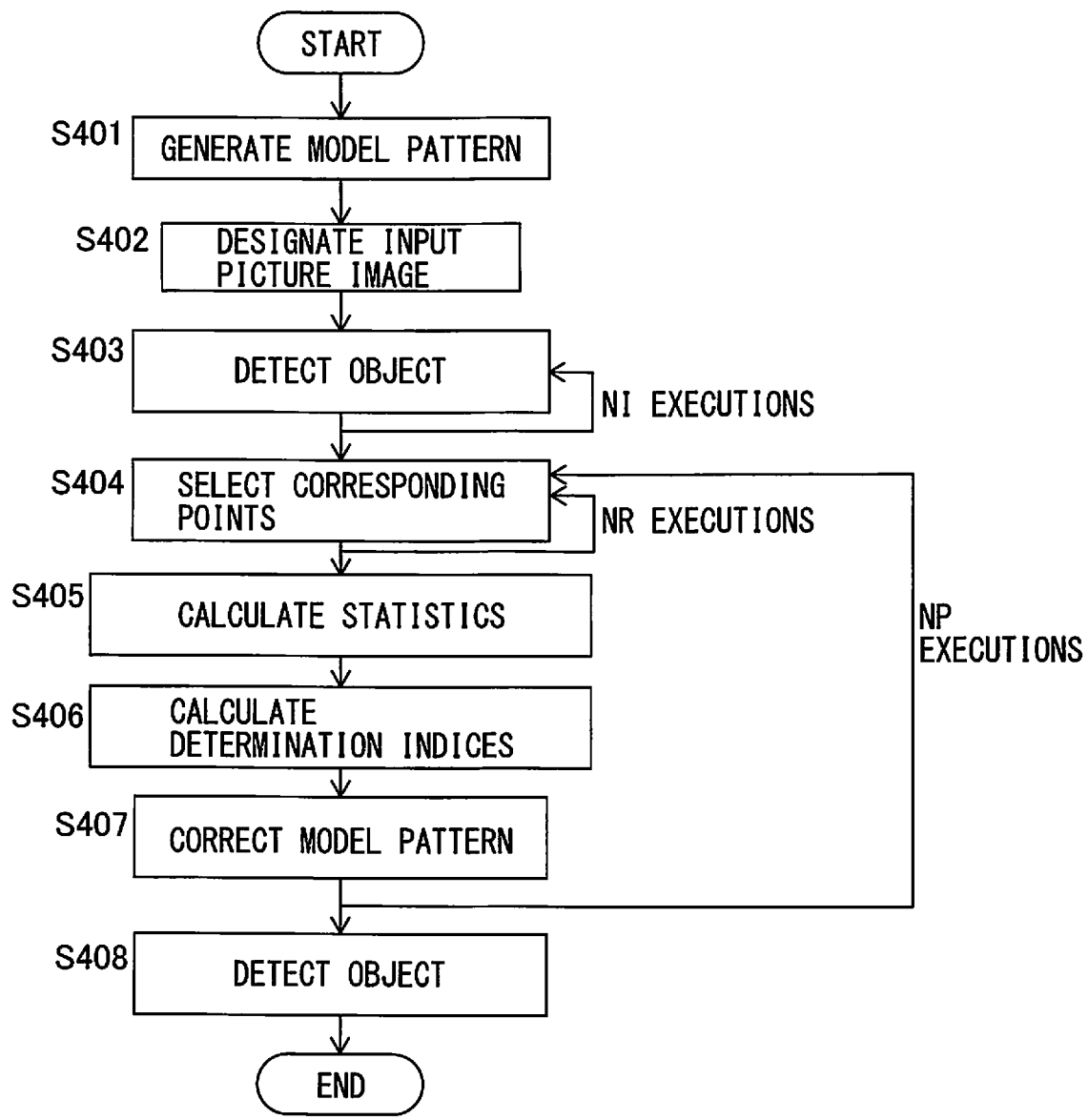
FIG. 10 is a flowchart illustrating processing according to a third embodiment.

FIG. 10 is a flowchart illustrating processing according to the third embodiment.

Steps S401 to S404 are the same as steps S101 to S104 in the first embodiment. NO_i corresponding points determined to correspond to the i-th first feature point P_i forming the model pattern have been found, as in the end of step S104. The m-th corresponding point corresponding to the i-th first feature point P_i of the model pattern is defined as O_im (m=1 to NO_i).

In step S405, the statistics of the physical quantities of the NO_i corresponding points O_im corresponding to the first feature point P_i are calculated. The following statistics, for example, are calculated. This calculation can be performed as in step S307 of the second embodiment.

1. The standard deviation of a distance d_im between the first feature point P_i and the corresponding point O_im is calculated. Assuming that the distance d_im (m=1 to NO_i) varies according to a normal distribution, a standard deviation σd of the distance d_im can be calculated using a well-known method.

2. The average and standard deviation of the luminance gradient magnitude are calculated. Assuming that the magnitude of the luminance gradient held at the corresponding point O_im varies according to a normal distribution, an average μa and a standard deviation σα can be calculated from the luminance gradient at the corresponding point O_im (m=1 to NO_i).

3. The probability distribution of the luminance gradient magnitude is calculated. Assume that the luminance gradient magnitude varies according to a mixture of normal distributions. A mixture of normal distributions p(x) with the magnitude of the luminance gradient at the corresponding point O_im (m=1 to NO_i) as a probability variable is given by:

$$p(x) = \sum_{b=1}^{NB} \pi_b N(x|\mu a_b, \sigma a_b)$$

The parameters $\pi_b$, $\mu a_b$, and $\sigma a_b$ (b=1 to NB) in the above-mentioned equation can be obtained using a well-known method.

In step S406, determination indices W_i are obtained from the calculated statistics. The following determination indices can be respectively obtained using the statistics calculated in step S405.

(a) The tolerance of the distance is calculated from the standard deviation σd of the distance d_im. A determination index indicates that a mismatch has occurred when the distance is equal to or larger than 3σd or equal to or smaller than −3σd. Since first feature points having large σd involve variations in position of second feature points of the object to be detected, they have a tolerance to large variations, while first feature points having small σd have a tolerance to only relatively small variations.

(b) The average µα and standard deviation σα of the luminance gradient magnitude are used to tolerate only second feature points having luminance gradient magnitudes of µα−2σα to µ+2σα.

(c) The probability distribution p(x) of the luminance gradient magnitude is used to set a determination index indicating whether the probability that a particular luminance gradient magnitude will be taken is equal to or higher than a predetermined value. When the probability that a particular luminance gradient magnitude will be taken is higher than a given threshold p_min, tolerance is determined. In this case, the threshold p_min and the parameters $\pi_b$, $\mu\alpha_b$, and $\sigma\alpha_b$ (b=1 to NB) defining a mixture of normal distributions are held in the determination index.

In step S407, the obtained determination indices W_i are stored in a model pattern storage unit 26 in association with the first feature point P_i. Instead of thresholds obtained from the statistics, the statistics themselves may be stored as determination indices.

The processes in steps S404 to S407 are performed for each feature point P_i (i=1 to NP) forming the model pattern. The determination indices are stored in the model pattern storage unit 26 in association with the feature points P_i forming the model pattern, in a form as depicted as, e.g., FIG. 16.

In step S408, the object detection unit 23 detects the object using the determination indices stored in the model pattern storage unit 26.

One method for using determination indices in the object detection unit 23 is to obtain an image T_x of the object, then calculate the degree of match to each image of the object, and exclude an image T_x of the object having a low degree of match. This method will be described below.

1. A new image Inew is captured.

2. An object is detected from the image Inew. An arbitrary method is used in detection, as in step S103. Upon this process, NTX images T_x (x=1 to NTX) of the object have been obtained. The following processes in 3 to 6 are performed for all images T_x of the object.

3. Of second feature points Qnew_k (k=1 to NQ) extracted from the images Inew, second feature points Qnew_k corresponding to a first feature point P_i forming the model pattern are selected on the basis of a position/posture R_Tx of the image T_x of the object detected from the image Inew.

4. It is confirmed whether the selected second feature points are appropriate as corresponding points for the first feature point P_i. Determination indices associated with P_i are used. For example, the selected second feature point is determined to be appropriate when the luminance gradient magnitude β of this second feature point falls within the range of µα−2σα to µ+2σα (see step S408 for the definition of µ, α, and σ). Appropriate corresponding points are stored in the detection result storage unit 27 as corresponding points O_i for P_i.

5. The above-mentioned processes in 3 and 4 are performed for all feature points P_i (i=1 to NP) so that NO corresponding points can be selected.

6. The number NP of first feature points forming the model pattern and the number NO of found corresponding points are used to obtain NO/NP so that the degree of match between the model pattern and the image T_x can be represented using values of 0.0 to 1.0.

Alternatively, the individual degrees of match between a particular first feature point P_i and its corresponding points Oi may be calculated as S_i to determine S_i/NP as the degree of match between the model pattern and the image T_x. The individual degrees of match S_i can be obtained using the physical quantities of both the first feature point P_i and the corresponding points O_i. For example, letting d_i be the distance between the physical quantity of the first feature point P_i and the corresponding point O_i, S_i can be obtained upon defining a particular constant d_max, as:

$$S\_i = 1 - |d\_i|/d\_max$$

where |d_i| is a value equal to or smaller than d_max.

7. When the calculated degree of match between the model pattern and the image T_x is smaller than a predetermined threshold Smin, the image T_x of the object is excluded from the detection results.

The method for using determination indices in the object detection unit is not limited to this. For example, even the ICP algorithm includes the step of selecting corresponding points for first feature points forming a model pattern. In the step of selecting the corresponding points, a match/mismatch between the first feature points and the second feature points can be determined using determination indices.

This allows detection in the object detection unit using corresponding points determined more accurately.

According to the third embodiment, determination indices optimal to detect an object can be provided for each first feature point forming the model pattern, and used to detect an object. This produces the following advantageous effects.

Depending on the part of the first feature point forming the model pattern, for example, the variation in position may be large or small. When the variation in position is small, a second feature point having a distance equal to or larger than the variation is more likely to be an inappropriate corresponding point. Erroneous correspondence can be prevented by avoiding the use of such second feature points as corresponding points. Erroneous correspondence of corresponding points may adversely affect the detection accuracy or result in erroneous detection. Further, when the variation in position is large, it is highly probable that tolerating only small variations may hinder detection of corresponding points for the first feature point. This may lower the degree of match, resulting in failure of detection of an object. Preventing such adverse effects may improve the robustness and the accuracy of the detection result.

The determination indices stored in the model pattern storage unit 26 can also be used in the corresponding point selection unit according to, e.g., the first embodiment. For example, appropriateness can be evaluated using the determination indices in the step of evaluating whether the second feature points Q_jk are appropriate as corresponding points for the first feature point P_i in the corresponding point selection unit.

1. In accordance with the third embodiment, determination indices are provided to each feature point P_i (i=1 to NP) forming the model pattern. In this case, the determination index used indicates whether the distance di between the first feature point and the second feature point falls within the range of $-3\sigma d$ to $3\sigma d$.

2. The corresponding point selection unit evaluates whether the distance di between the first feature point P_i and the second feature point Q_jk falls within the range of $-3\sigma d$ to $3\sigma d$, and the second feature point Q_jk is determined to be appropriate when the distance di falls within this range; otherwise, the second feature point Q_jk is determined to be inappropriate.

3. The subsequent processes are performed using as corresponding points, only second feature points Q_jk determined to be appropriate.

This can calculate the statistic of a predetermined physical quantity using corresponding points determined more accurately.

Although the first to third embodiments assume that the vision sensor uses a camera and the data input from the vision sensor represents a picture image, the present invention is also applicable when the vision sensor is implemented in a three-dimensional sensor.

Three-dimensional sensors include that which measures three-dimensional points on the plane of an object, as in the light-section method, and that which measures three-dimensional points on the contour edges of an object, as in the stereo method.

Individual three-dimensional points forming a set of three-dimensional points output from the three-dimensional sensor can be directly used as first feature points forming a model pattern according to the present invention. A model pattern may be preferably generated using three-dimensional points located within the designated region as first feature points, as in the first embodiment.

A set of three-dimensional points representing a model can also be obtained from CAD data representing the shape of an object. Three-dimensional points on a plane may be obtained from the CAD data at a predetermined interval or three-dimensional points on a contour edge may be obtained at a predetermined interval.

When three-dimensional points forming the input data are located on the plane of an object, not only the position of the feature point but also the direction of a normal can be used as physical quantities of each feature point. An exemplary method for obtaining normals in a set of three-dimensional points is well-known in, e.g., Niloy J. Mitra, et al., "Estimating Surface Normals in Noisy Point Cloud Data," SCG'03 Proceedings of nineteenth annual symposium on Computational geometry, pages 322-328, 2003.

When three-dimensional points forming the input data are located on the contour edge of an object, a direction vector connecting feature points adjacent on the contour edge can be used as a physical quantity of each feature point.

The direction of a normal and a direction vector can be used as the posture of the feature point.

When the three-dimensional sensor outputs not only three-dimensional points but also luminance information or color information, luminance information or color information can be added as a physical quantity of the feature point. A luminance gradient can even be calculated as a physical quantity of the feature point using the luminances of neighboring three-dimensional points, as a matter of course.

Feature points in a set of three-dimensional points may take other forms such as SHOT described in Federico Tombari, et al., "Unique Signatures of Histograms for Local Surface Description," Computer Vision, ECCV 2010, Part III. LNCS 6313, pp. 356-369, 2010.

Even when the input data represents a set of three-dimensional points, it is possible to detect an object and obtain its position/posture. Examples include a method as described in Federico Tombari, et al., "Object recognition in 3D scenes with occlusions and clutter by Hough voting," IEEE 2010 Fourth Pacific-Rim Symposium on Image and Video Technology.

Again, even when the input data represents a set of three-dimensional points, the ICP algorithm can be used. The method for detecting an object from a set of three-dimensional points is not limited to such examples, as a matter of course.

When the input data represents a set of three-dimensional points on a plane, the corresponding point selection unit obtains the distance between the position R_Pi of the first feature point P_i and the position R_Qjk' of the second feature point Q_jk when viewed from the model pattern coordinate system, using the following method.

The distance between two points R_Pi and R_Qjk' is simply obtained.

An intersection between a normal to the first feature point P_i and a plane obtained from a set of neighboring points of the second feature points Q_jk is obtained to calculate the distance between the intersection and the first feature point.

Although a plurality of feature points form a model pattern in the first to third embodiments, not a plurality of feature points but one feature point may form a model pattern. When only one feature point forms a model pattern, adjusting the position of the feature point, as in the first embodiment, is meaningless. This is because adjusting the position of the model pattern amounts to changing the relative positional relationship between feature points. However, such adjustment is significant even for only one feature point in adding a feature point or changing the determination index. For example, the use of only one feature point may lead to too many detection results. In such a case, the detection results can be more reliably limited by adding a matched feature point, as in the second embodiment, or changing the determination index, as in the third embodiment, to optimize the model pattern. However, the use of only one feature point may pose practical problems resulting from too many candidates for detection results. For example, when an edge point is used as a feature point, the use of only one feature point may lead to too many matched detection results. However, the use of a feature point such as SIFT may keep the number of matched feature points small to a certain extent.

In the first to third embodiments, after a model pattern is initially generated, an input picture image is designated and an object is detected by, e.g., the detection operation of a robot apparatus illustrated as FIG. 3. This can correct the initially set model pattern on the basis of a picture image obtained by an actual operation. In this case, the range of matching in detecting an object is set relatively wide until a predetermined number of processes are completed after a model pattern is set, and an object which falls within a relatively wide error range is determined as an object. Every time a predetermined number of processes are performed, the model pattern is corrected to one more suitable for an actual object. After a predetermined number of processes, the range of matching may be narrowed or the like on the basis of the corrected model pattern to increase the probability that correct determination will be performed or the like. Conversely, the range of matching may be widened according to the actual conditions of an object, as a matter of course.

When the model pattern is corrected on the basis of a picture image upon the above-mentioned actual operation, the robot apparatus may reflect on correction processing of the model pattern, the result of success or failure of an operation performed on the basis of the detection result obtained by the image processing device. In an image processing device according to a fourth embodiment to be described next, the result of success or failure of an operation performed on the basis of the detection result obtained by the image processing device is reflected on correction processing of the model pattern.

Figure 19:
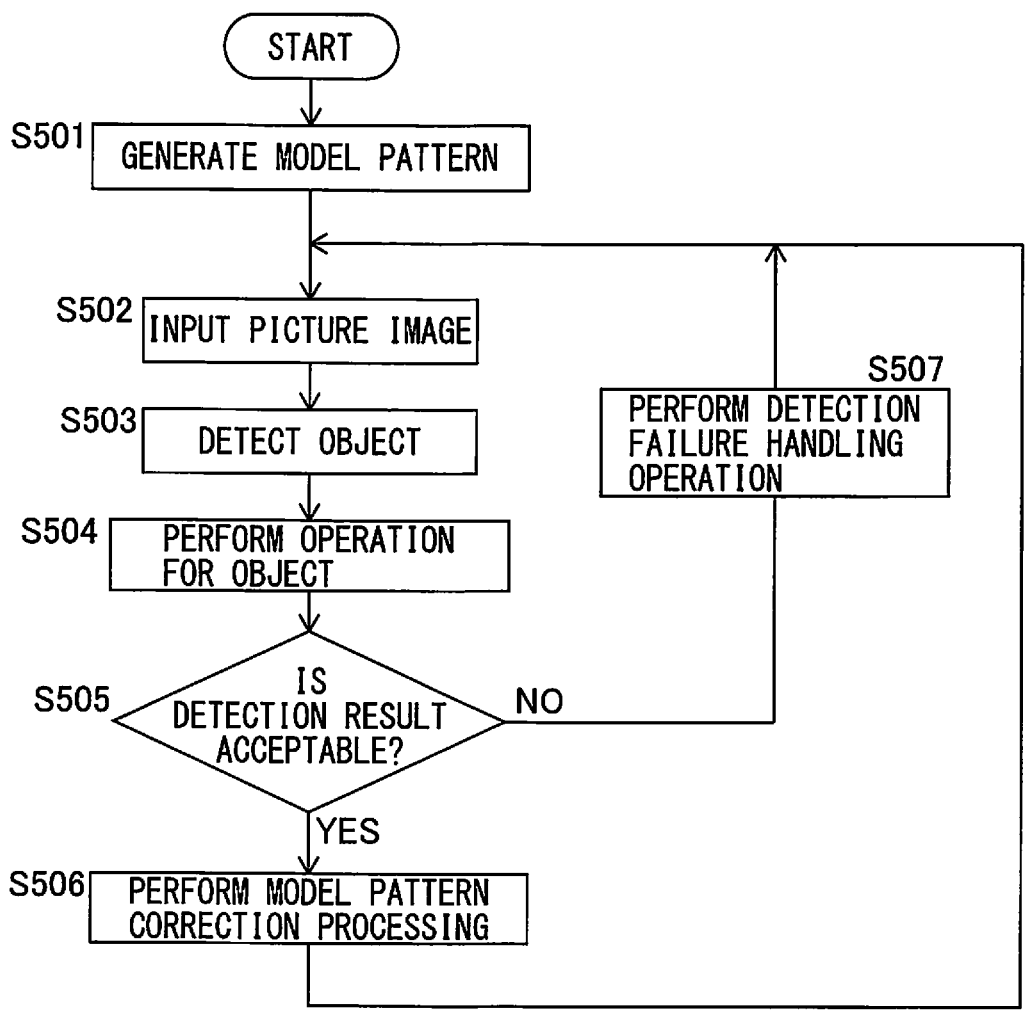
FIG. 19 is a flowchart illustrating processing according to a fourth embodiment.

FIG. 19 is a flowchart illustrating processing in the image processing device according to the fourth embodiment.

In the image processing device according to the fourth embodiment, only when an operation based on the detection result obtained by the image processing device of the robot apparatus is successful, an image of an object in this case is reflected on correction of the model pattern, and an image of an object when such an operation is failed is not reflected on correction of the model pattern.

Generation of a model pattern in step S501 is the same as in other embodiments.

Image input in step S502 and object detection in step S503 are also the same as in other embodiments and are performed for each operation that uses the detection result obtained by the image processing device.

In step S504, an operation based on the detection result of an object in step S503 is performed. As a result of the operation, success or failure of the operation is determined and, for failure, for example, the detection result of an object is assumed to suffer a problem.

In step S505, the acceptability of the detection result is determined and when this result is acceptable (when the operation is successful), the process advances to step S506; otherwise (when the operation is failed), the process returns to step S507.

In step S506, correction processing of the model pattern in steps S104 to S106 of the first embodiment, steps S304 to S311 of the second embodiment, or steps S404 to S407 of the third embodiment is performed and the process returns to step S502.

In step S507, a predetermined handling operation for detection failure (operation failure), such as removal of an object which results in operation failure or recording of the picture image, is performed and the process then returns to step S502.

Although embodiments of the present invention have been described above, various modifications may be made, as a matter of course.

According to the present invention, an object can be precisely detected even when the physical quantities of feature points of the object vary.

What is claimed is:

1. An image processing device for detecting an object from input data captured by a vision sensor, on the basis of a model pattern comprising a set of a plurality of first feature points representing a shape of the object, the device comprising a processor configured to:

detect, from the input data, a plurality of images of the object by matching between a plurality of second feature points extracted from the input data and the plurality of first feature points forming the model pattern, for each image among the plurality of images of the object detected from the input data, select second feature points corresponding to the plurality of first feature points forming the model pattern from the plurality of second feature points forming the image, and store, as corresponding points, the selected second feature points in association with the first feature points, and for each of the plurality of first feature points forming the model pattern, calculate a statistic of a predetermined physical quantity of the plurality of corresponding points, said plurality of corresponding points present in the plurality of images, and correct the first feature point on the basis of the calculated statistic of the predetermined physical quantity, wherein the processor is further configured to:

for each image among the plurality of images of the object detected from the input data, store as a feature point candidate, at least one second feature point which corresponds to none of the first feature points forming the model pattern of the plurality of second feature points forming the image, and for each other image among the plurality of images, select a second feature point corresponding to the at least one stored feature point candidate, and store, as a corresponding point, the selected second feature point in association with the feature point candidate, and for each of the at least one stored feature point candidate, calculate a statistic of a predetermined physical quantity of a plurality of corresponding points associated with the feature point candidate, and add the feature point candidate to the model pattern as a first feature point on the basis of the statistic of the predetermined physical quantity.

* * * * *